United States Patent
Song et al.

(10) Patent No.: US 10,034,160 B2
(45) Date of Patent: Jul. 24, 2018

(54) METHOD AND APPARATUS FOR TRANSMITTING OR RECEIVING DATA USING BLUETOOTH IN WIRELESS COMMUNICATION SYSTEM

(71) Applicant: LG ELECTRONICS INC., Seoul (KR)

(72) Inventors: Taeyoung Song, Seoul (KR); Jonghun Song, Seoul (KR); Minsoo Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/486,846

(22) Filed: Apr. 13, 2017

(65) Prior Publication Data

US 2017/0303076 A1    Oct. 19, 2017

Related U.S. Application Data

(60) Provisional application No. 62/322,753, filed on Apr. 14, 2016.

(51) Int. Cl.
| | |
|---|---|
| *H04W 4/80* | (2018.01) |
| *H04L 1/16* | (2006.01) |
| *H04L 1/00* | (2006.01) |
| *H04W 4/00* | (2018.01) |

(52) U.S. Cl.
CPC .............. *H04W 4/80* (2018.02); *H04L 1/0071* (2013.01); *H04L 1/1607* (2013.01); *H04W 4/008* (2013.01)

(58) Field of Classification Search
CPC ..... H04L 1/0071; H04L 1/1607; H04W 4/008
See application file for complete search history.

(56) References Cited

U.S. PATENT DOCUMENTS

| | | | | |
|---|---|---|---|---|
| 2002/0018458 | A1* | 2/2002 | Aiello ............... | H04W 56/0015 370/348 |
| 2013/0102251 | A1* | 4/2013 | Linde ................. | H04L 1/04 455/41.2 |
| 2013/0322462 | A1* | 12/2013 | Poulsen ............. | H04J 3/06 370/458 |
| 2014/0086125 | A1* | 3/2014 | Polo .................. | H04W 52/0229 370/311 |
| 2015/0312858 | A1* | 10/2015 | Kerai ................ | H04W 52/0212 370/311 |
| 2015/0326274 | A1* | 11/2015 | Flood ................ | H04B 1/7143 375/132 |

(Continued)

*Primary Examiner* — Lewis West
(74) *Attorney, Agent, or Firm* — Birch, Stewart, Kolasch & Birch, LLP

(57) ABSTRACT

Disclosed are a method and apparatus for transmitting and receiving data using a Bluetooth low energy (BLE) technology. A method of transmitting or receiving data using Bluetooth low energy (BLE) in a wireless communication system includes forming Bluetooth LE connection with a second device, establishing an isochronous channel for transmitting an audio packet with the second device and transmitting audio packets to the second device through the isochronous channel using an interleaved method at a specific channel interval. The sequence in which the audio packets are transmitted may be determined regardless of whether acknowledgement (ACK) for each of the audio packets is received from the second device.

14 Claims, 23 Drawing Sheets

(56) References Cited

U.S. PATENT DOCUMENTS

2016/0192115 A1\* 6/2016 Weiss .................... H04W 4/008
                                                    455/41.2
2017/0244576 A1\* 8/2017 Batra ................ H04L 12/40058
2017/0251469 A1\* 8/2017 Lee ................... H04W 72/0446

\* cited by examiner

[Fig.1]
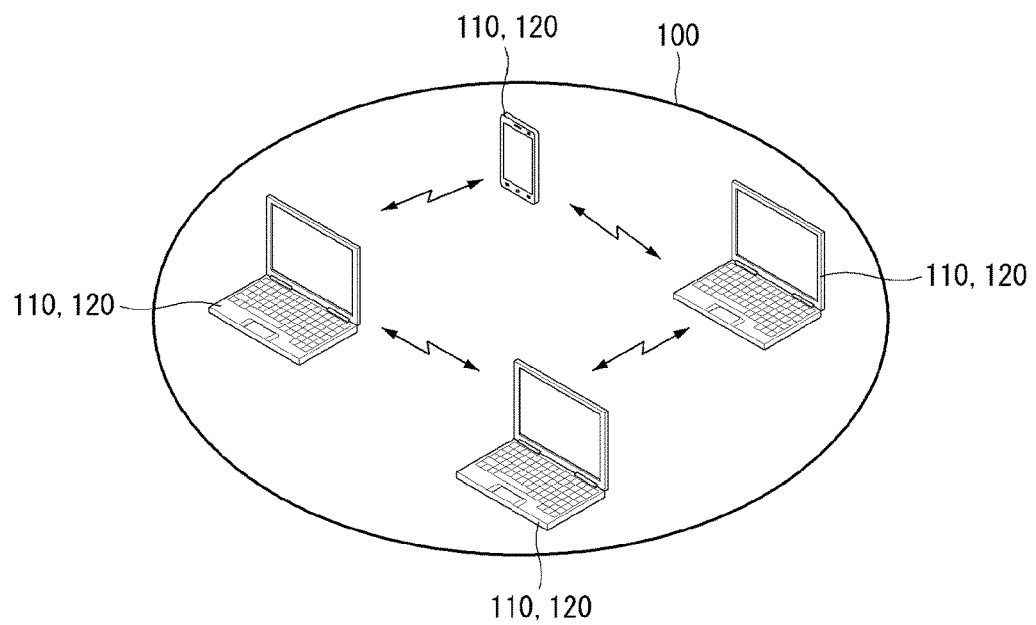

[Fig.2]
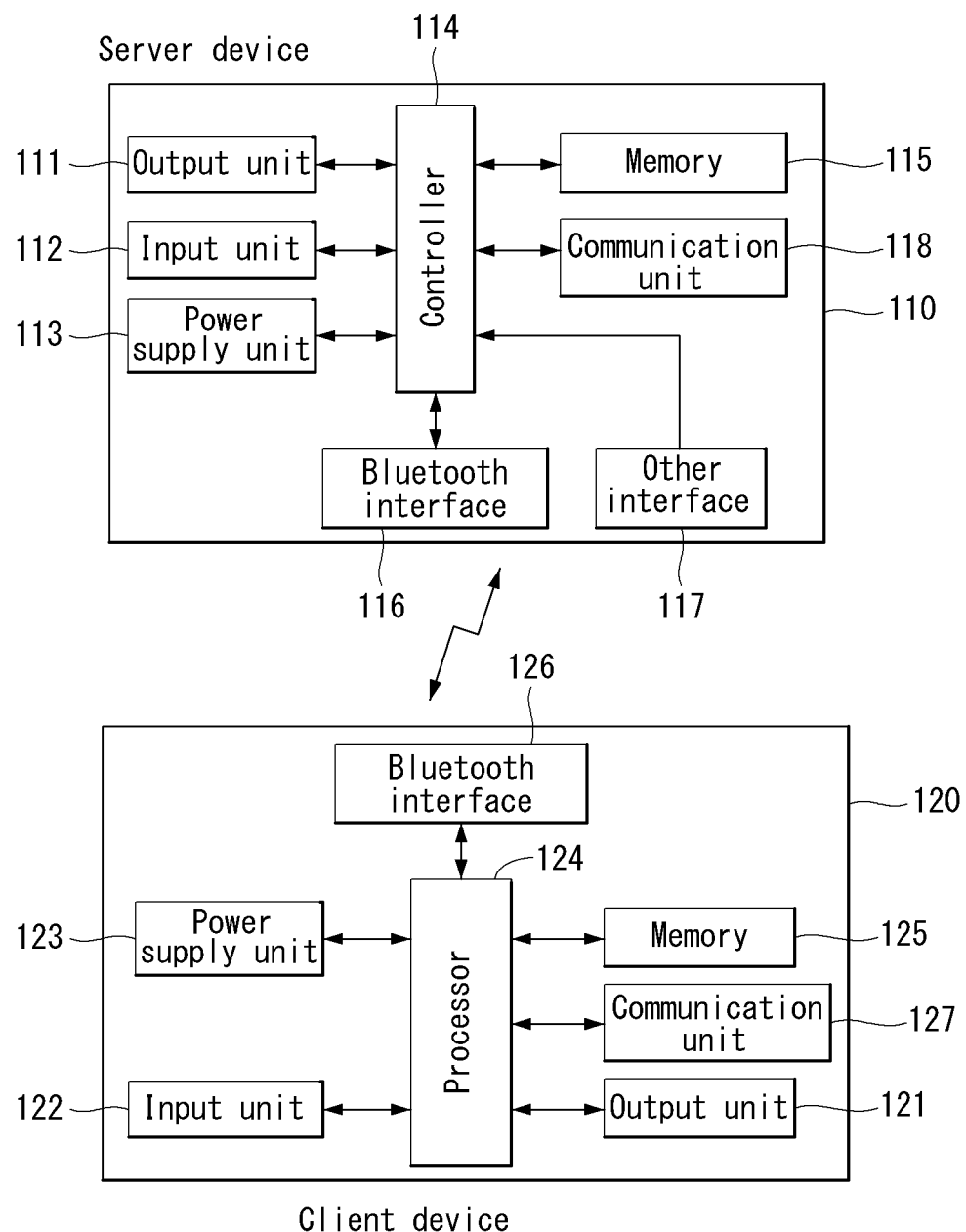

[Fig.3]
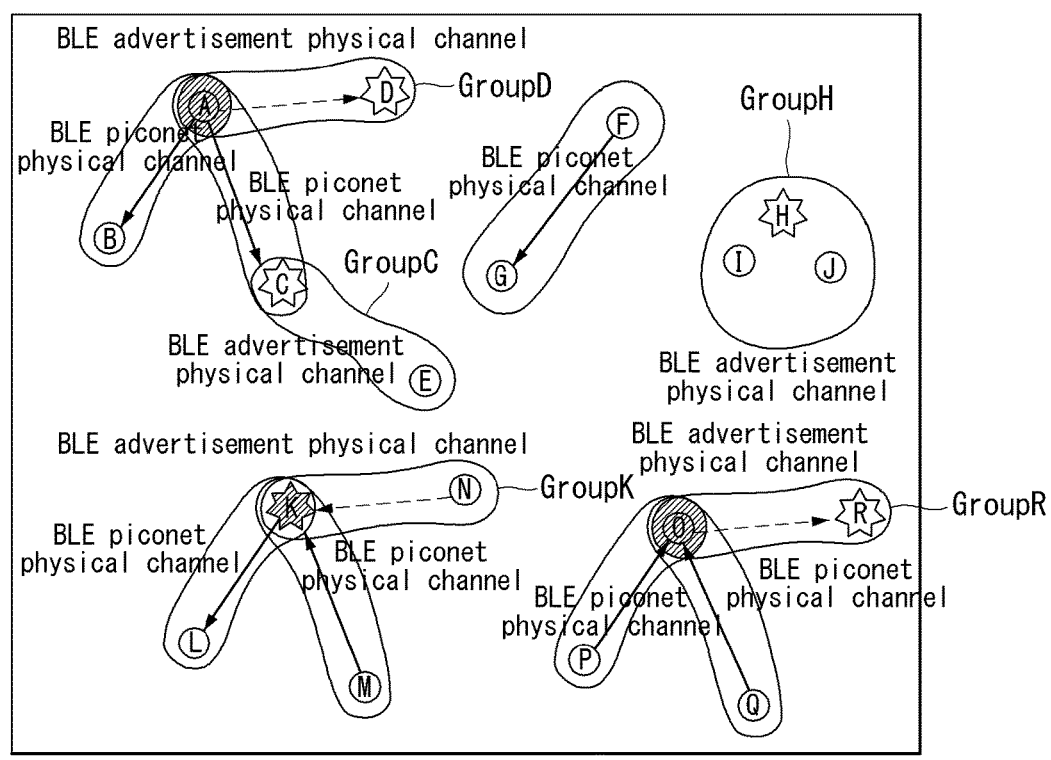

[Fig.4]
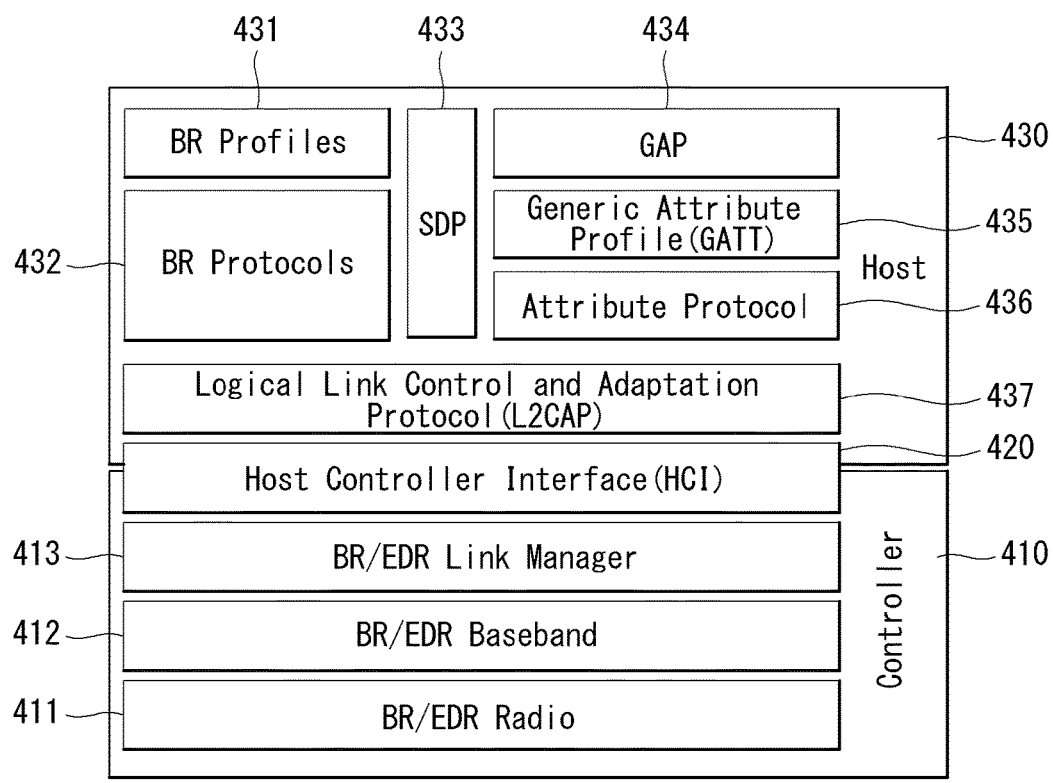

[Fig.5]
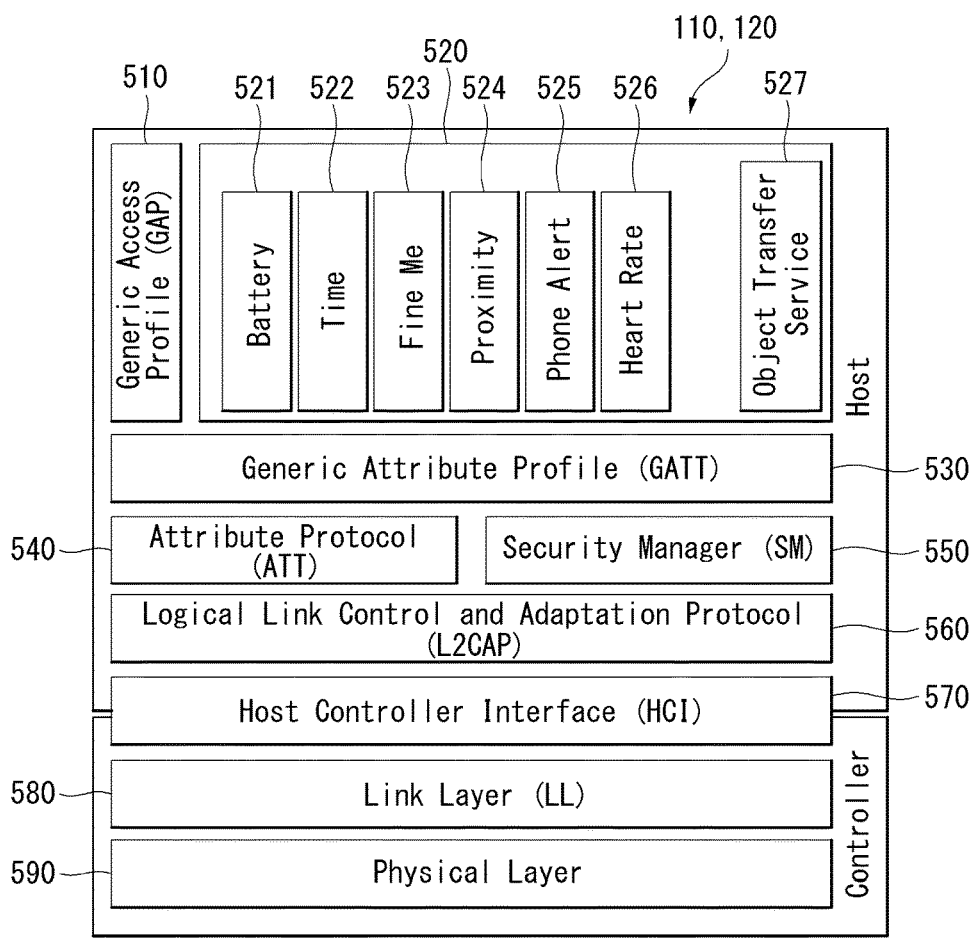

[Fig.6]
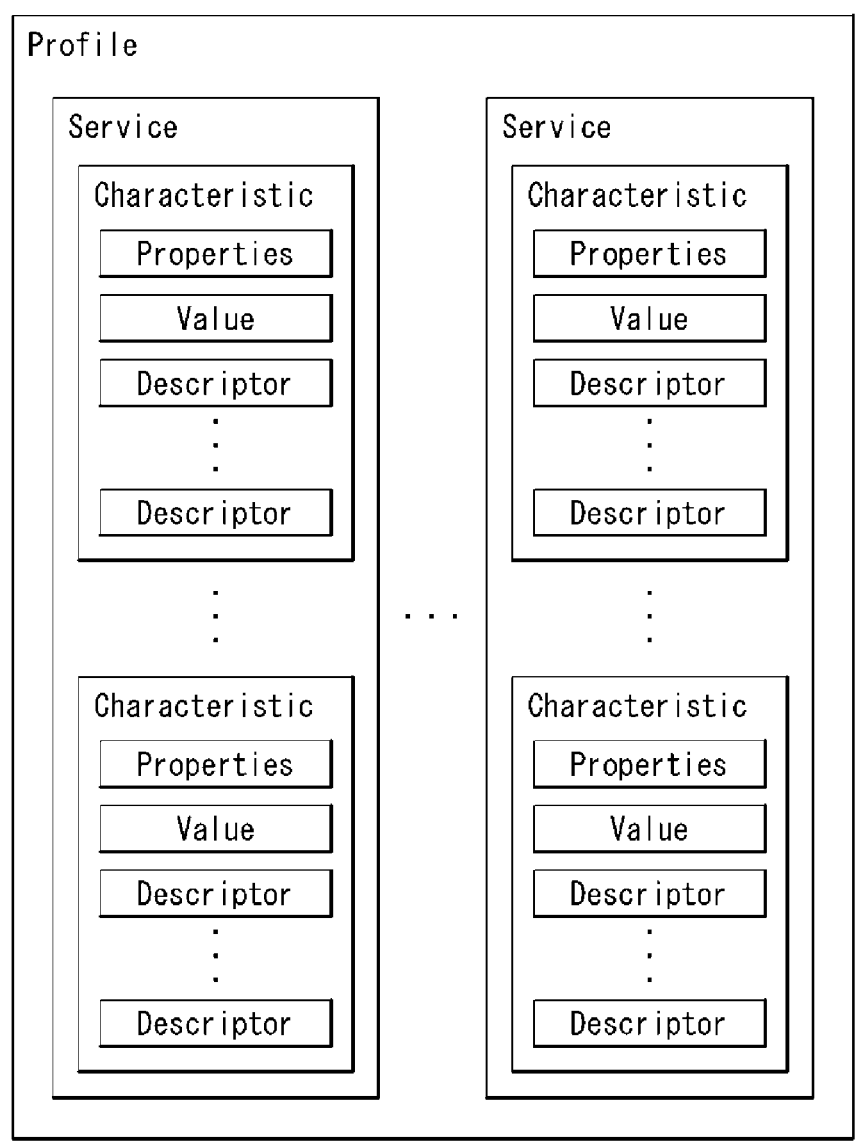

[Fig.7]
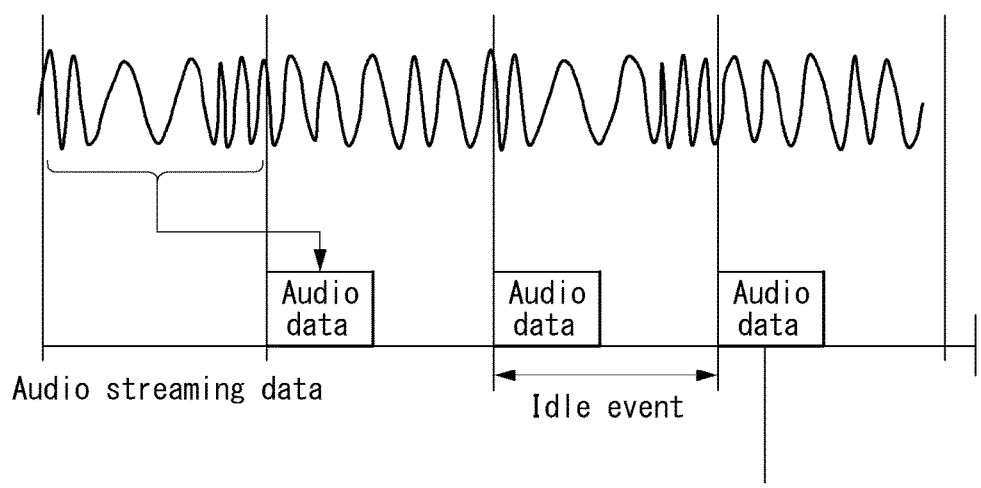

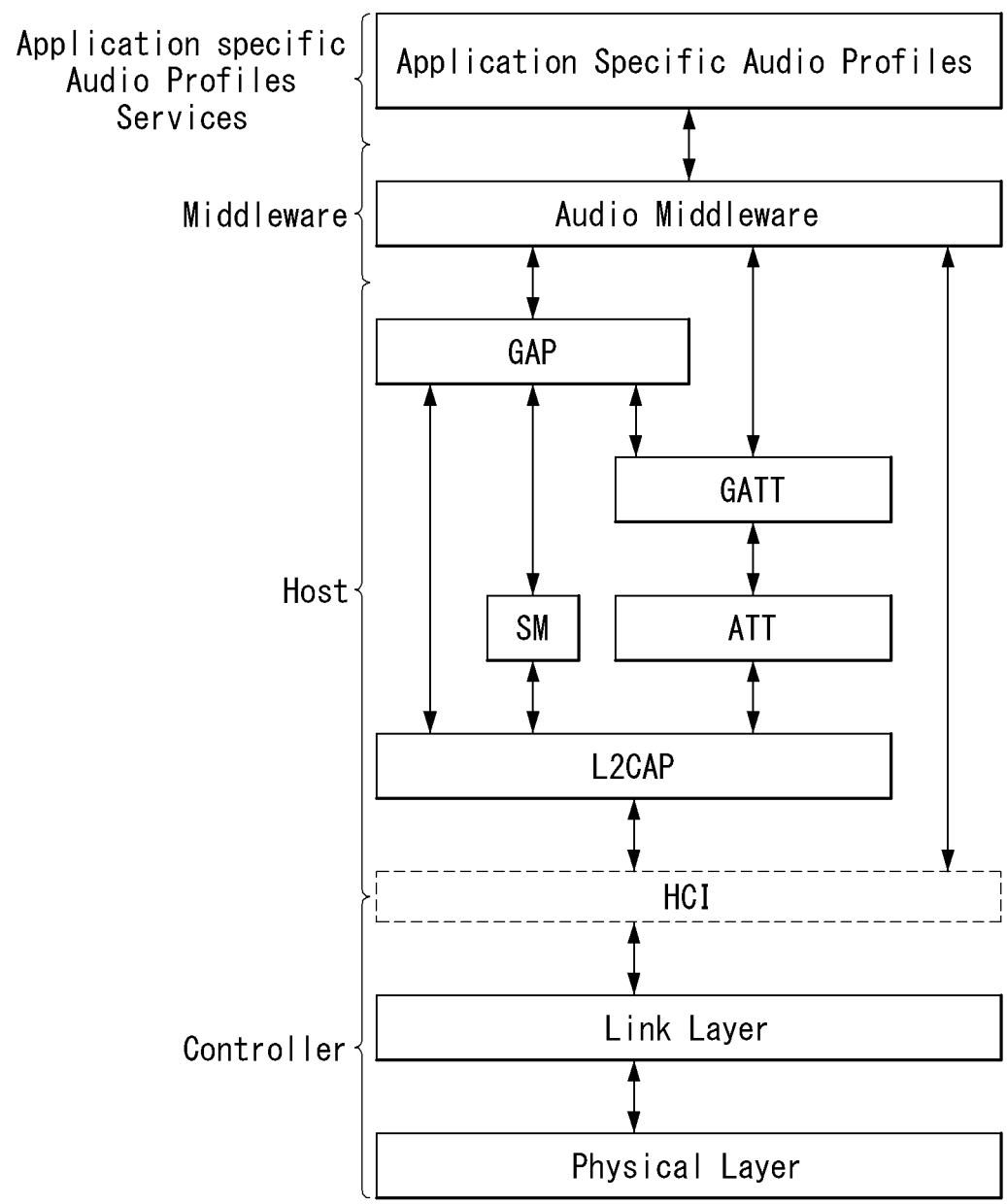

[Fig.9]
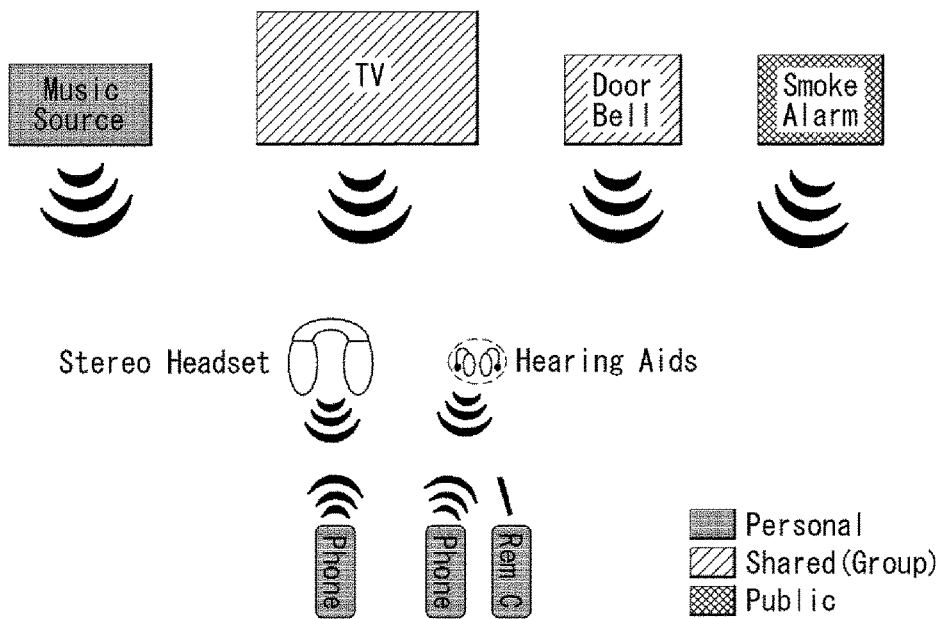

[Fig.10]
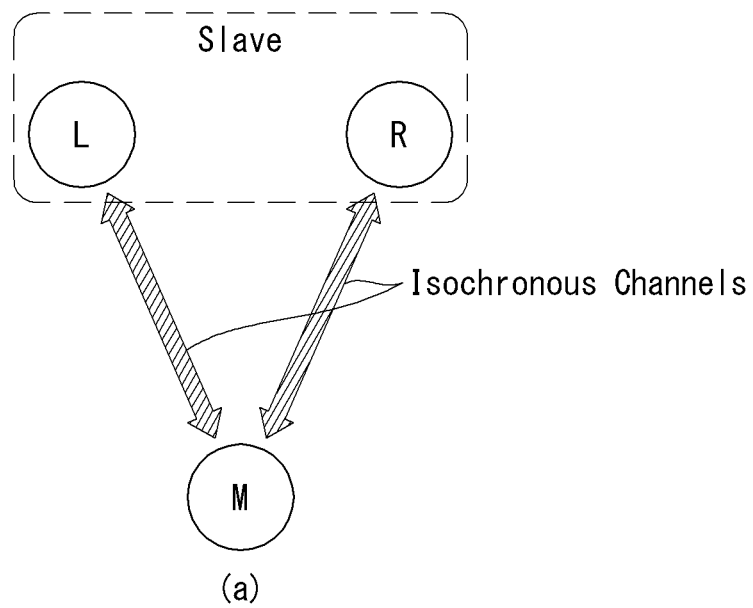
(a)
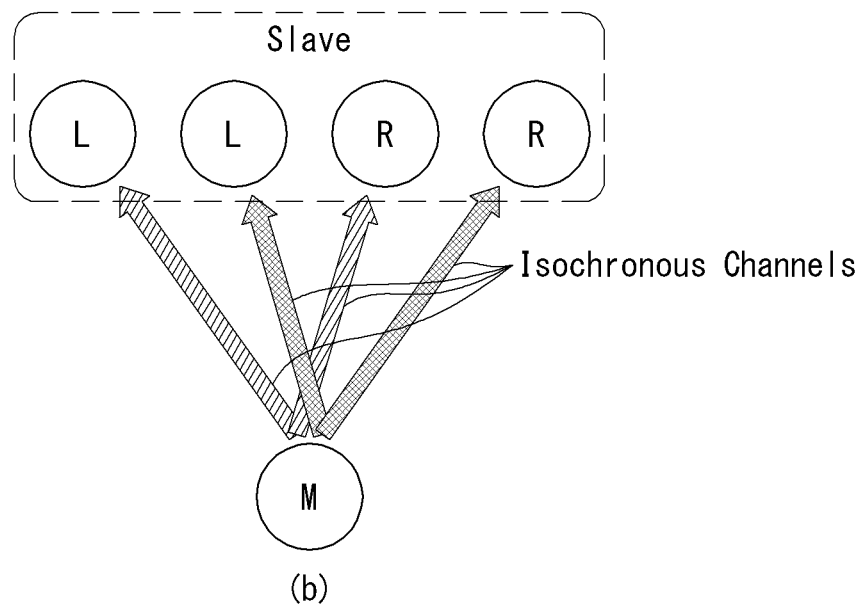
(b)

[Fig.11]
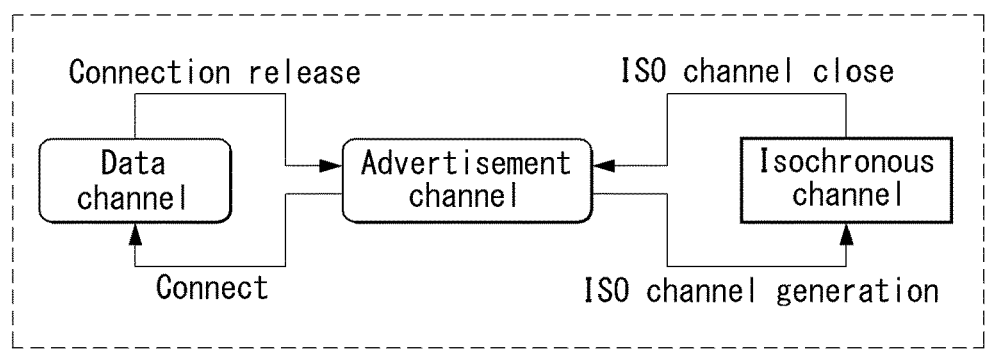

[Fig.12]
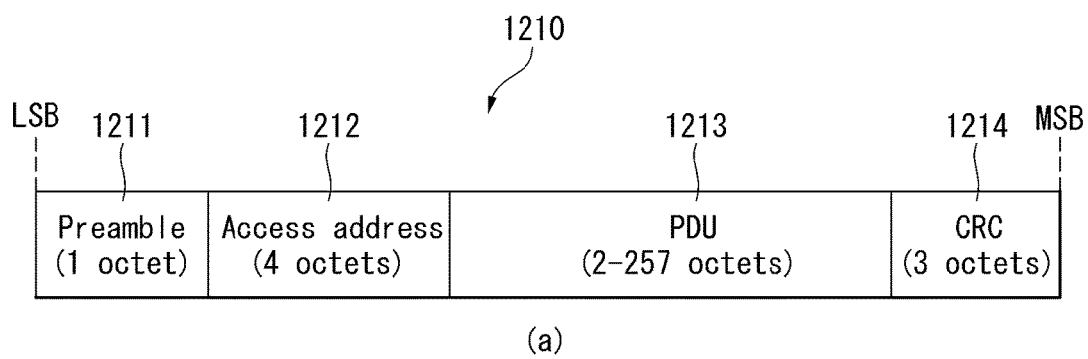
(a)
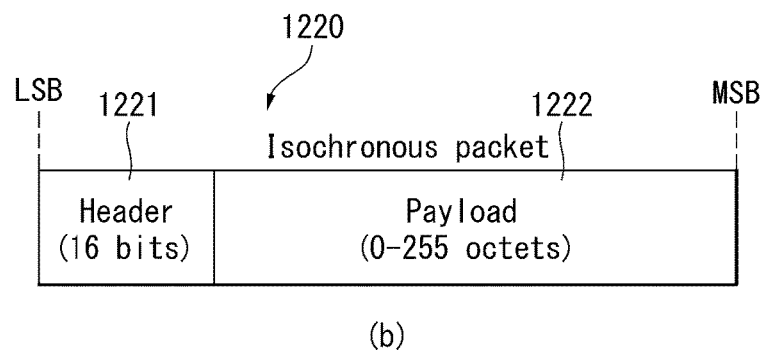
(b)

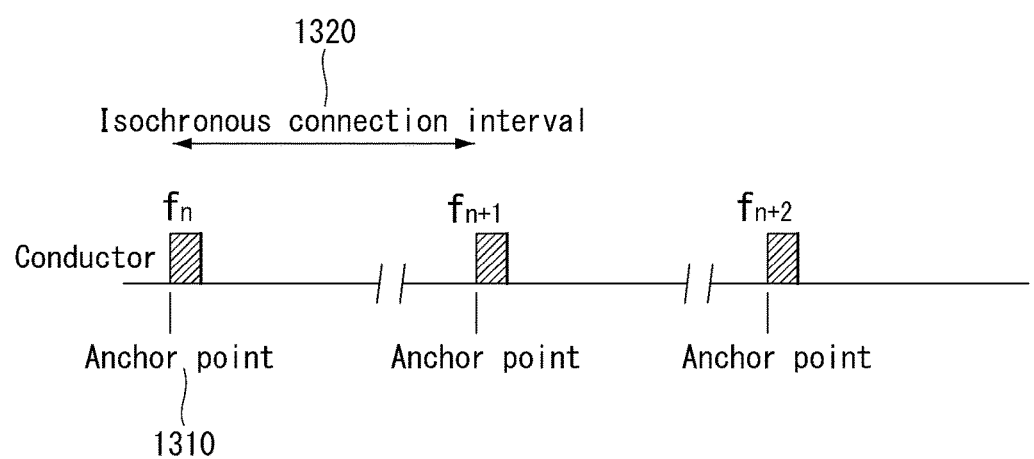
[Fig.13]

[Fig.14]
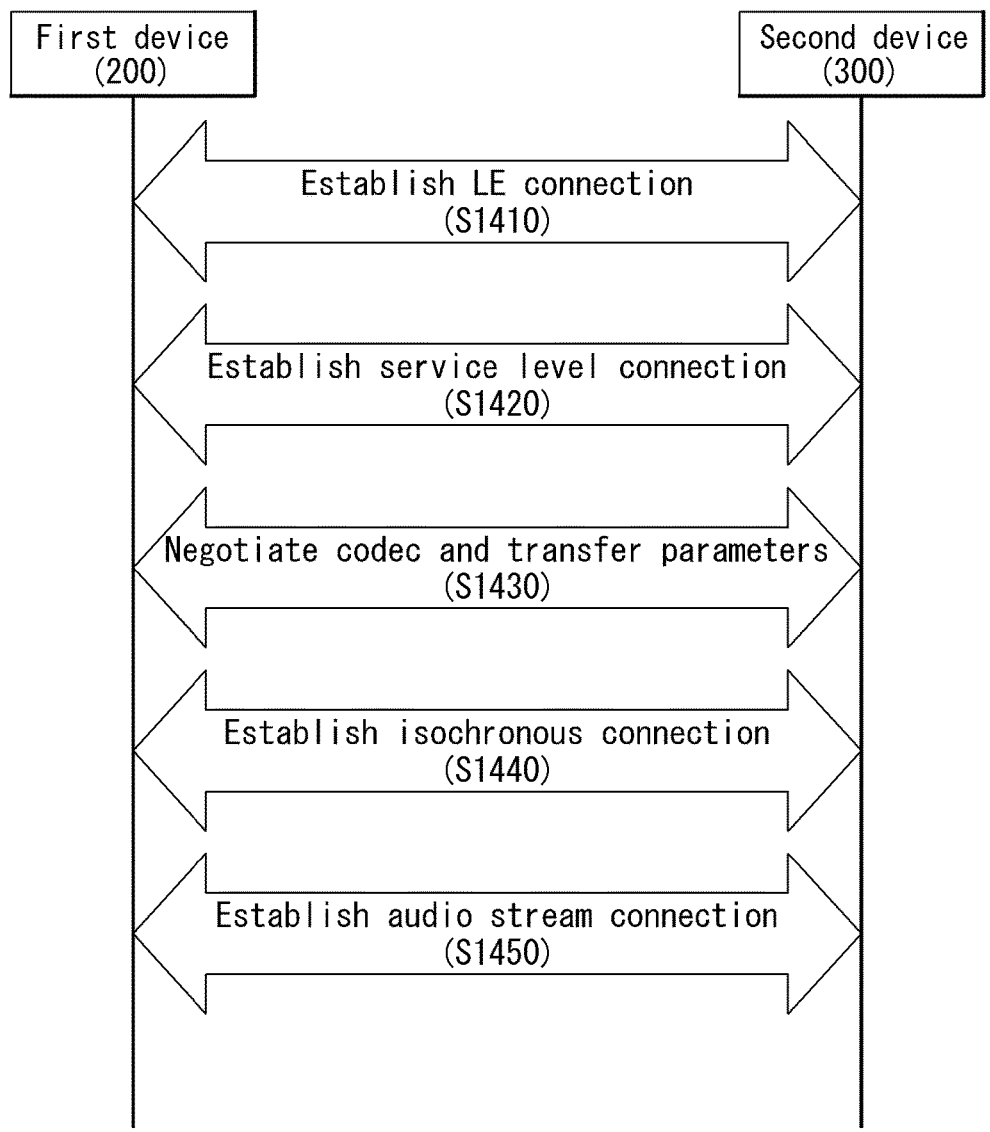

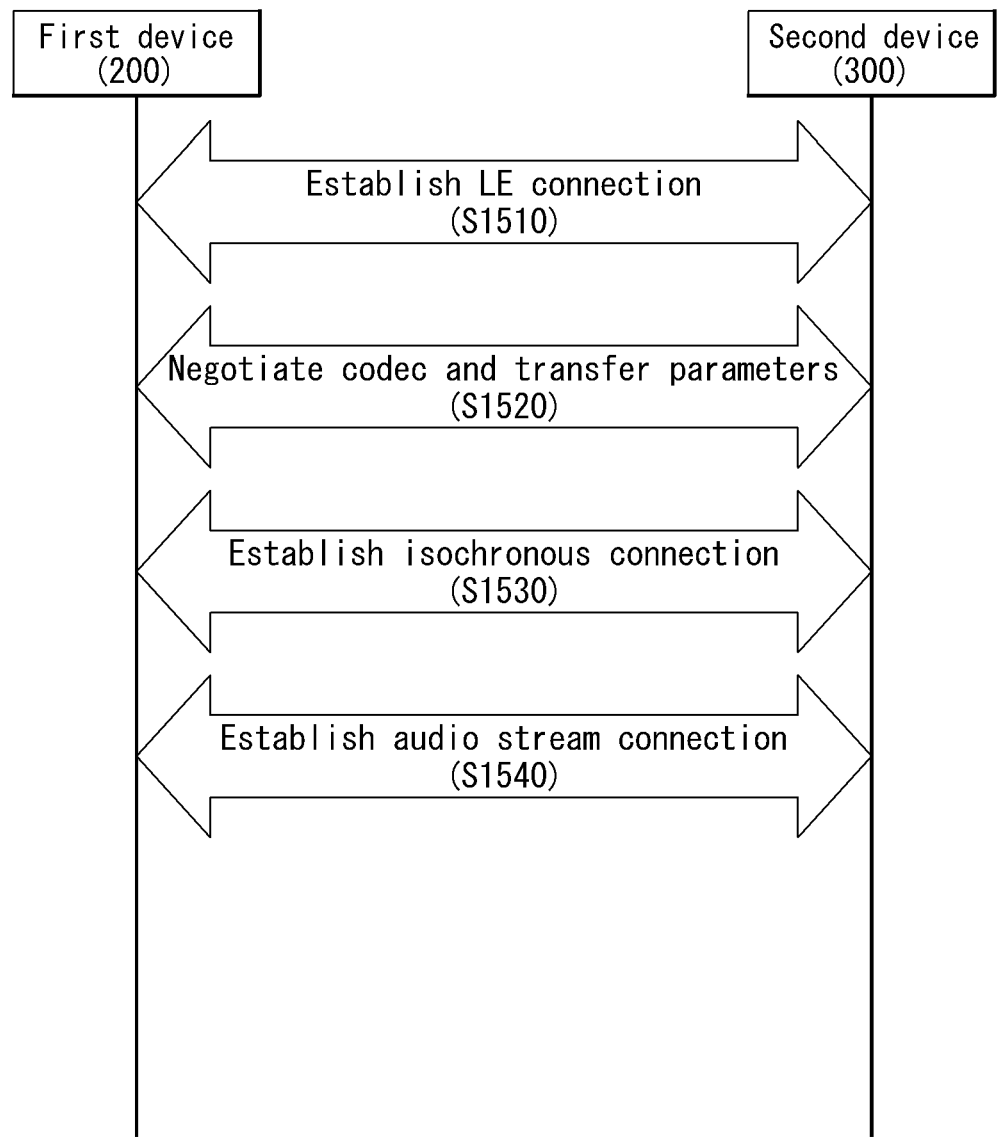
[Fig.15]

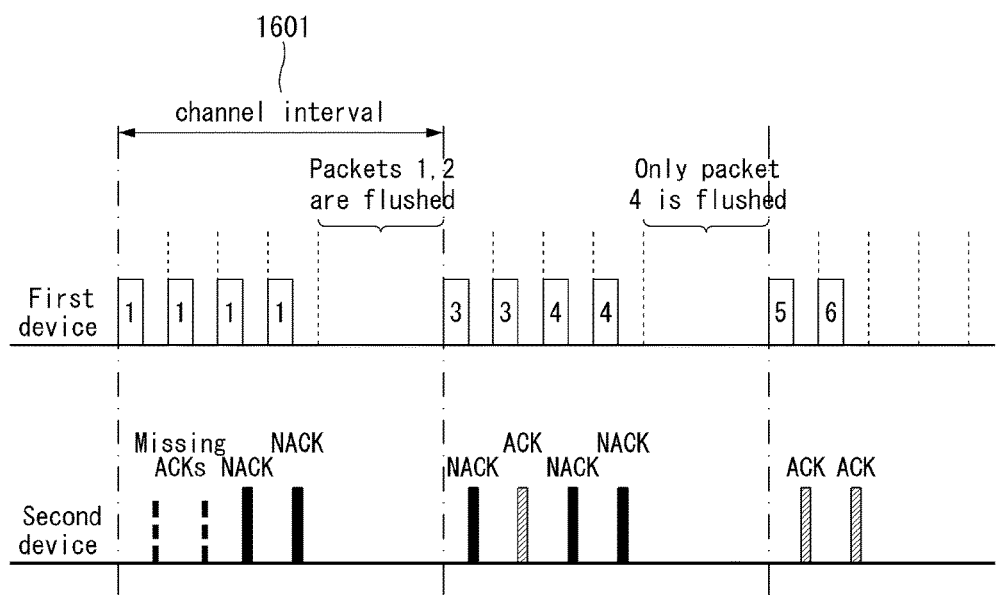
[Fig.16]

[Fig.17]
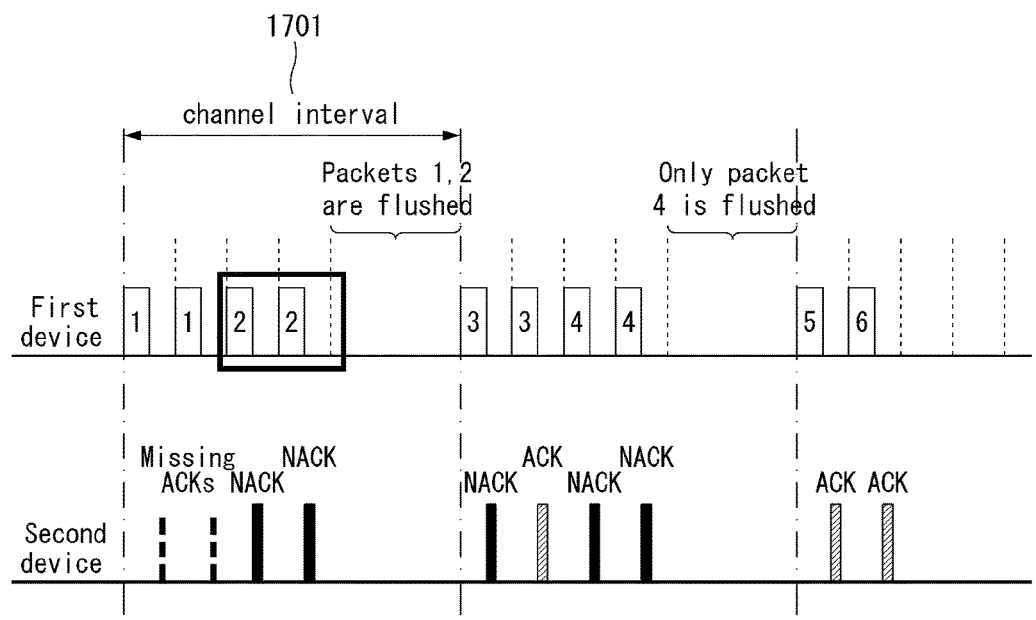

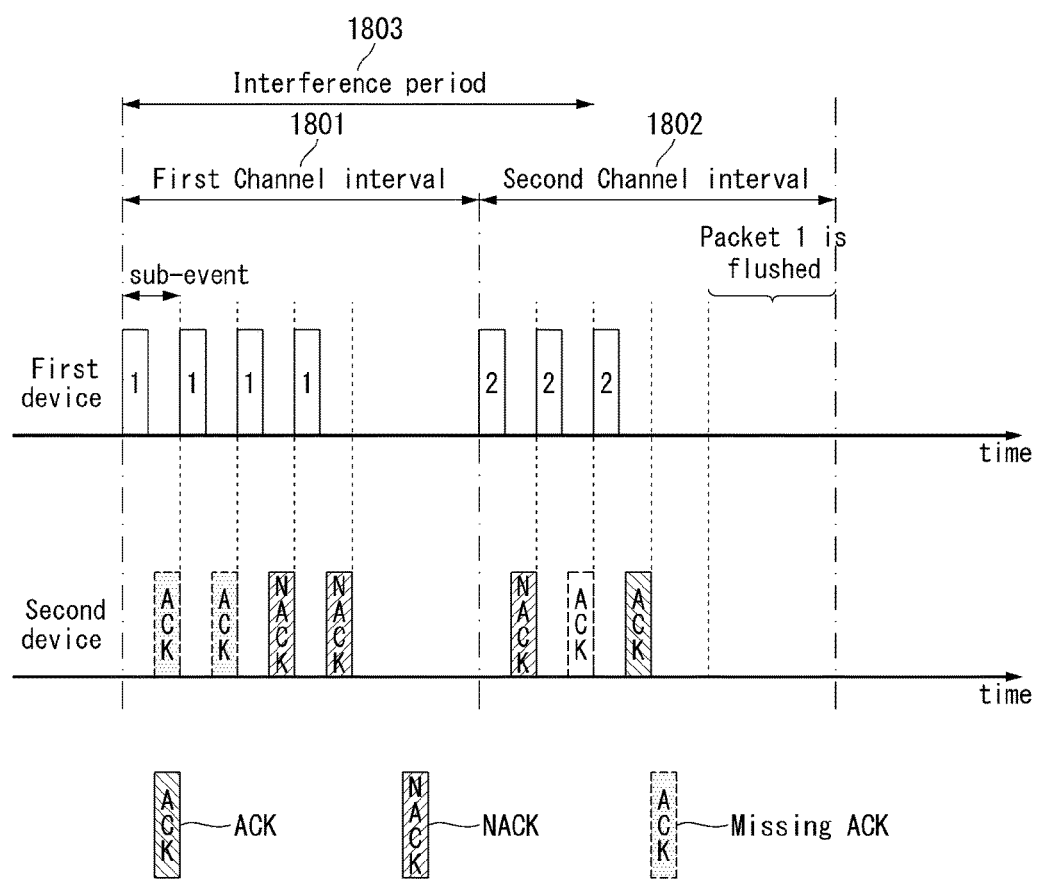
[Fig.18]

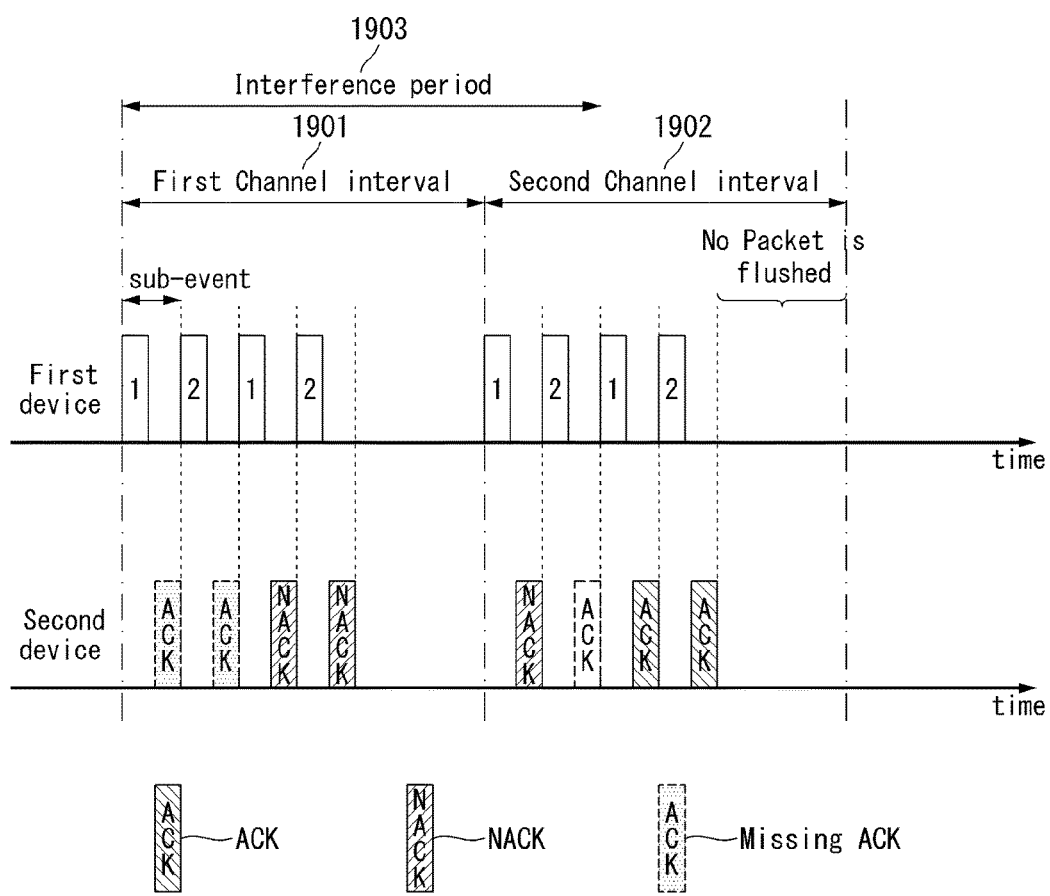

[Fig.20]
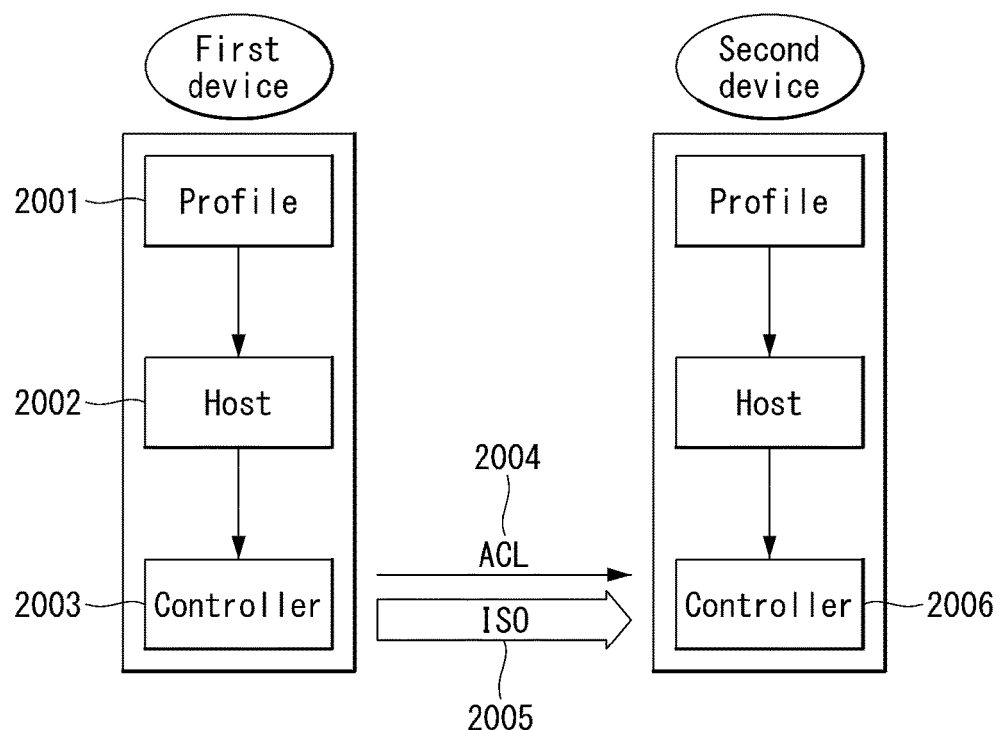

[Fig.21]

| Stream Info | | | | | |
|---|---|---|---|---|---|
| ChannelNum (5 bits) | Interleaved (1 bit) | NSE (5 bits) | BN (3 bits) | StreamID (1 octet) | channelID (1 octet) |

[Fig.22]
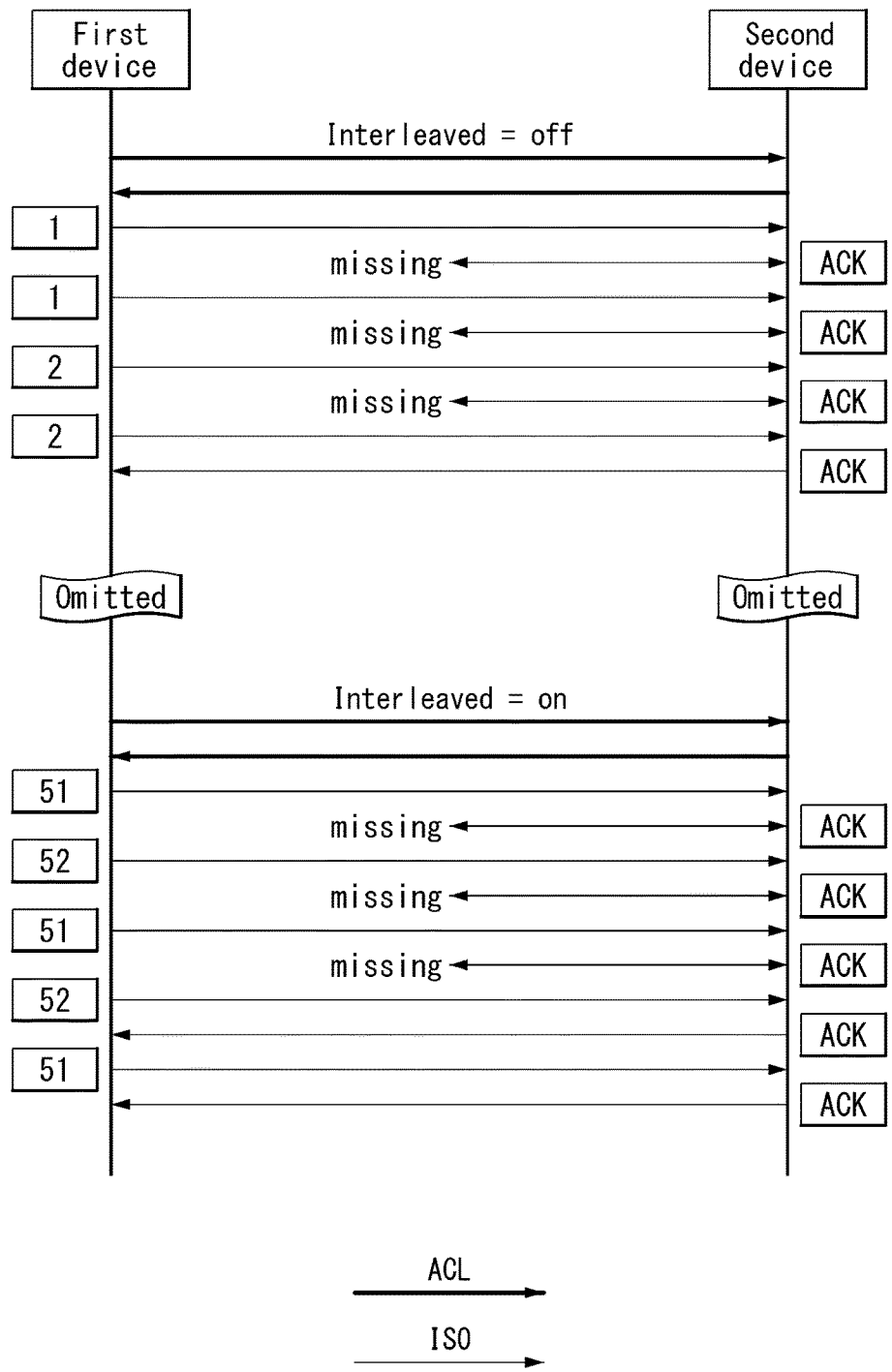

[Fig.23]
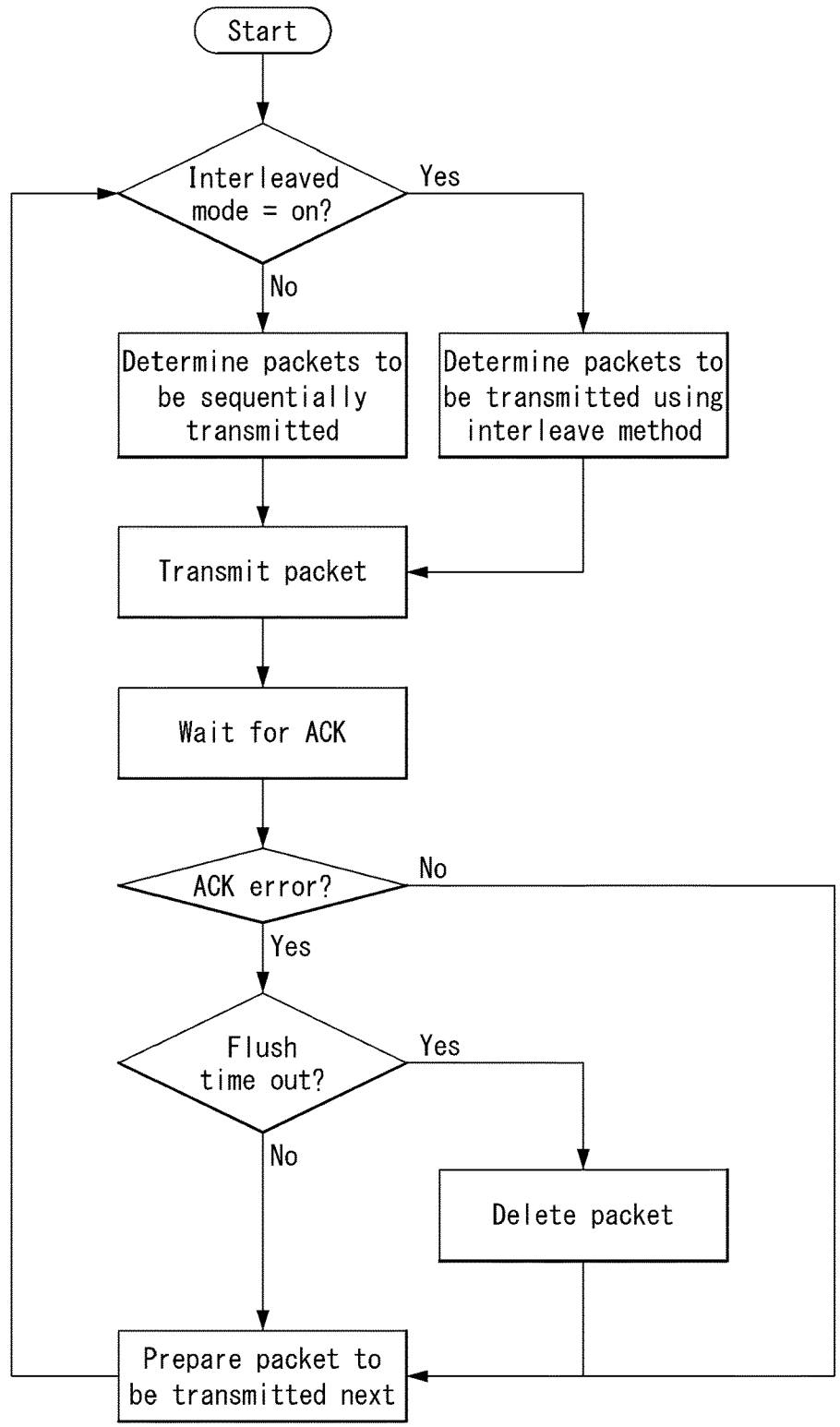

METHOD AND APPARATUS FOR TRANSMITTING OR RECEIVING DATA USING BLUETOOTH IN WIRELESS COMMUNICATION SYSTEM

CROSS-REFERENCE TO RELATED APPLICATION

This application claims priority to Provisional Application No. 62/322,753 filed on 14 Apr. 2016 in U.S.A. the entire contents of which are hereby incorporated by reference in its entirety.

BACKGROUND OF THE INVENTION

Field of the Invention

The present invention relates to a method and apparatus for transmitting or receiving data using Bluetooth, that is, a short-distance technology, in a wireless communication system, and more specifically, to a method and apparatus for providing an audio stream using a Bluetooth low energy (BLE) technology.

Discussion of the Related Art

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

SUMMARY OF THE INVENTION

Embodiments of the present invention propose a method and apparatus for providing an audio stream using a Bluetooth low energy (BLE) technology.

According to an aspect of the present invention, a method of transmitting or receiving data using Bluetooth low energy (BLE) in a wireless communication system includes forming Bluetooth LE connection with a second device, establishing an isochronous channel for transmitting an audio packet with the second device and transmitting audio packets to the second device through the isochronous channel in interleaved method during a specific channel interval. The sequence in which the audio packets are transmitted may be determined regardless of whether acknowledgement (ACK) for each of the audio packets is received from the second device.

The method may further include transmitting audio stream information related to audio stream composed of the audio packets to the second device. The audio stream information may include at least one of a channel number indicative of the number of channels allocated to the audio stream, the number of sub-events indicative of the number of sub-events per channel interval, a burst number indicative of the number of audio packet which is capable of being transmitted during the specific channel interval, and a stream ID for identifying the audio stream or a channel ID for identifying a channel through which the audio stream is transmitted.

The audio stream information may be transmitted through an asynchronous connection logical (ACL) transport channel.

Transmitting the audio packets to the second device may include setting an interleaved mode to on or off indicative of a mode in which the audio packets are transmitted in interleaved method. When the interleaved mode is on, the audio packets may be transmitted to the second device through the isochronous channel in interleaved method.

The audio stream information may further include interleaved mode information indicative of the on or off of the set interleaved mode.

The method may further include periodically synchronizing the sequence in which the audio packets are transmitted with the second device.

An audio packet for which ACK has not been received from the second device or an audio packet for which negative acknowledgement (NACK) has been received from the second device may be flushed after the at specific channel interval elapses.

According to another aspect of the present invention, a first device for transmitting or receiving data using Bluetooth low energy (BLE) in a wireless communication system includes a communication unit configured to communicate with an outside in a wireless or wired manner and a processor operatively connected to the communication unit. The processor is configured to form Bluetooth LE connection with a second device, establish an isochronous channel for transmitting an audio packet with the second device, and transmit audio packets to the second device through the isochronous channel in interleaved method during a specific channel interval. The sequence in which the audio packets are transmitted may be determined regardless of whether acknowledgement (ACK) for each of the audio packets is received from the second device.

The processor may be configured to transmit audio stream information related to audio stream composed of the audio packets to the second device. The audio stream information may include at least one of a channel number indicative of the number of channels allocated to the audio stream, the number of sub-events indicative of the number of sub-events per channel interval, a burst number indicative of the number of audio packet which is capable of being transmitted during the specific channel interval, and a stream ID for identifying the audio stream or a channel ID for identifying a channel through which the audio stream is transmitted.

The audio stream information may be transmitted through an asynchronous connection logical (ACL) transport channel.

The processor may be configured to set an interleaved mode to on or off indicative of a mode in which the audio packets are transmitted in interleaved method and to transmit the audio packets to the second device through the isochronous channel in interleaved method when the interleaved mode is on.

The audio stream information may further include interleaved mode information indicative of the on or off of the set interleaved mode.

The processor may be configured to periodically synchronize the sequence in which the audio packets are transmitted with the second device.

An audio packet for which ACK has not been received from the second device or an audio packet for which negative acknowledgement (NACK) has been received from the second device may be flushed after the at specific channel interval elapses.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 shows an example of a wireless communication system using a BLE technology according to an embodiment of the present invention.

FIG. 2 shows an example of an internal block diagram of a server device and a client device capable of implementing methods according to embodiments of the present invention.

FIG. 3 shows an example of a BLE network topology.

FIGS. 4 and 5 show examples of Bluetooth communication architecture to which methods according to embodiments of the present invention may be applied.

FIG. 6 shows an example of the GATT Profile structure of the BLE specification.

FIG. 7 shows characteristics of an audio signal.

FIG. 8 shows an example of a protocol stack of BLE which may use an isochronous channel.

FIG. 9 shows an example of a home ecosystem for applications to which an isochronous channel may be applied.

FIG. 10 shows an example of the type of an isochronous channel.

FIG. 11 shows an example of operating state transition according to the BLE technology.

FIG. 12 shows examples of an isochronous channel packet format which may be applied to methods according to embodiments of the present invention.

FIG. 13 shows an example of the basic format of isochronous channel transfer to which methods according to embodiments of the present invention may be applied.

FIG. 14 is a flowchart illustrating an example of a method for sending and receiving audio streams through an LE connection to which a method proposed in this specification may be applied.

FIG. 15 is a flowchart illustrating another example of a method for sending and receiving audio streams through an LE connection to which a method proposed in this specification may be applied.

FIG. 16 is an embodiment to which the present invention may be applied and is a diagram illustrating a method for transmitting or receiving an audio stream through Bluetooth LE connection.

FIG. 17 is an embodiment to which the present invention may be applied and is a diagram illustrating a method for transmitting or receiving an audio stream through Bluetooth LE connection.

FIG. 18 is a diagram for illustrating a problem which may be generated in a process of transmitting or receiving an audio stream through Bluetooth LE connection.

FIG. 19 is an embodiment to which the present invention may be applied and is a diagram for illustrating a method for transmitting or receiving an audio stream through Bluetooth LE connection.

FIG. 20 is an embodiment to which the present invention may be applied and is a diagram illustrating a method for transmitting audio data through Bluetooth LE.

FIG. 21 is an embodiment to which the present invention may be applied and is a diagram showing an example of audio stream information.

FIG. 22 is an embodiment to which the present invention may be applied and is a diagram illustrating a method for transmitting audio data using an interleaved mode method.

FIG. 23 is an embodiment to which the present invention may be applied and is a diagram illustrating a method for transmitting audio data using Bluetooth LE.

DETAILED DESCRIPTION OF THE EMBODIMENTS

Hereinafter, the present invention is described in more detail with reference to appended drawings.

A suffix, such as "module" and "unit" introduced in the description herein, is assigned merely to facilitate description of this document, and the "module" and "unit" may be used interchangeably.

In this document, a device refers to a device capable of wireless communication, including a mobile phone, such as a smart phone, a tablet PC, a desktop computer, a notebook, and television, such as smart TV and IPTV.

Hereinafter, embodiments of the present invention are described in detail with reference to the accompanying drawings and description contained in the drawings, but the technical scope of the present invention is not restricted by the embodiments.

Wherever possible, general terms widely known to the public have been chosen as long as the terms do not obscure their technical functions intended in the present invention; however, those terms may be changed depending on the intention of those skilled in the art, practices, or the advent of a new technology.

In some cases, specific terms are chosen arbitrarily; in that case, a specific meaning of a corresponding term is described in a corresponding description.

Therefore, the terms used in this document should be interpreted on the basis of their actual meanings and description throughout the document rather than the immediate names of the terms.

FIG. 1 shows an example of a wireless communication system using a BLE technology according to an embodiment of the present invention.

The wireless communication system 100 includes at least one server device 110 and at least one client device 120.

The server device and the client device perform Bluetooth communication using Bluetooth low energy (hereinafter referred to as "BLE", for convenience sake) technology.

First, compared to a Bluetooth basic rate/enhanced data rate (BR/EDR) technology, the BLE technology requires a relatively small duty cycle. Products based on the BLE technology may be manufactured at a low cost, and may require very small power consumption at a low speed data transfer rate. The products may operate more than one year with a coin cell battery.

Furthermore, the BLE technology simplifies a connection procedure between devices and requires a smaller packet size than the Bluetooth BR/EDR technology.

Features of the BLE technology may be summarized as follows: (1) the number of RF channels is 40, (2) a data transfer rate of 1 Mbps is supported, (3) a star topology is used, (4) latency is 3 ms, (5) a maximum current is less than 15 mA, (6) output power is less than 10 mW (10 dBm), and (7) major application fields include mobile phones, watch, sports, health-care, sensor, and device control.

The server device 110 may operate as a client device in a relationship with a different device. Likewise, the client device may operate as a server device in a relationship with a different device. In other words, in a BLE communication system, a device may operate as a server device or a client device. In some cases, a device may operate as a server device and a client device at the same time.

The server device 110 may be called a data service device, master device, master, server, conductor, host device, audio source device, or first device. The client device may be called a slave device, slave, client, member, sink device, audio sink device, or second device.

The server device and the client device form a main part of a wireless communication system, and the wireless communication system may include other elements in addition to the server device and the client device.

The server device refers to a device which receives data from a client, directly performs communication with the client device. When receiving a data request from the client device, the server device provides data to the client device through a response.

Furthermore, the server device sends a notification message and indication message to the client device to provide information to the client device. Furthermore, when transmitting an indication message to the client device, the server device receives a confirm message corresponding to the indication message from the client device.

Furthermore, the server device may provide information to the user through a display unit or receive a request input from the user through a user input interface while transmitting and receiving notification, indication, and confirm messages to and from the client device.

Furthermore, the server device may read data from a memory unit or write new data to the corresponding memory while transmitting and receiving messages to and from the client device.

Furthermore, one server device may be connected to a plurality of client devices and may be easily connected to client devices again using bonding information.

The client device 120 refers to a device which requests information and data transmission from a server device.

The client device receives data from the server device through a notification message and indication message.

When receiving an indication message from the server device, the client device sends a confirm message to the server device.

Like the server device, the client device may provide information to a user through a display unit or may receive an input from the user through a user input interface while transmitting and receiving messages to and from the server device.

Furthermore, the client device may read data from the memory unit or write new data into the memory unit while transmitting and receiving messages to and from the server device.

Hardware components, such as the display unit, user input interface, and memory unit of the server device or client device, are described in detail with reference to FIG. 2.

Furthermore, the wireless communication system may form a personal area network (PAN) using a Bluetooth technology. For example, the wireless communication system may exchange files and documents in a prompt and safe manner by forming a private piconet among devices.

A BLE device may operate in order to support various Bluetooth-related protocols, profiles, and processes.

FIG. 2 shows an example of the internal block diagram of a server device and client device capable of implementing methods according to embodiments of the present invention.

The server device may be connected to at least one client device.

Furthermore, in some embodiments, the internal block diagram of each device may further include other elements (or modules, blocks or units), and some of the elements of FIG. 2 may be omitted.

As shown in FIG. 2, the server device includes a display unit 111, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present invention.

Furthermore, the client device includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present invention.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device or the client device, and controls the server device or the client device in order in order to request the transmission of a message through the Bluetooth interface or other interface and to process a received message.

The processor 114, 124 may be represented by a controller or a control unit.

The processor 114, 124 may include application-specific integrated circuits (ASICs), other chipsets, logical circuits and/or data processing devices.

The memory 115, 125 may include read-only memory (ROM), random access memory (RAM), flash memory, a memory card, a storage medium and/or other storage devices.

The communication unit 118, 127 may include a baseband circuit for processing a radio signal. If an embodiment is implemented in the form of software, the aforementioned method may be implemented by a module (process or function) which performs the aforementioned function. The module is stored in the memory and is performed by the processor.

The memory 115, 125 may be installed inside or outside the processor 114, 124 and may be connected to the processor 114, 124 through various well-known means.

The display unit 111, 121 refers to a module for providing status information about a device and message exchange information to a user through a display.

The power supply unit 113, 123 refers to a module for receiving external or internal power under the control of the controller and for supplying power for the operation of each element.

As described above, BLE technology is characterized by a small duty cycle, and considerably reduces power consumption at a low data transfer rate. Accordingly, the BLE technology is capable of supplying power for the operation of each element even with small output power (which is less than 10 mW (10 dBm)).

The user input interface 112, 122 refers to a module for providing a user input, such as a display button to the controller, so that the user may control the operation of a device.

FIG. 3 shows an example of a BLE network topology.

Referring to FIG. 3, a device A corresponds to a piconet (piconet A, the shaded area) master having a device B and a device C as slaves.

In this case, a piconet refers to a set of devices in which one of a plurality of devices functions as a master and the others occupy a shared physical channel connected to the master device.

A BLE slave does not share a common physical channel with a master. Each slave communicates with a master through a separate physical channel. There is another piconet (piconet F) including a master device F and a slave device G.

A device K belongs to a scatternet K. In this case, the scatternet refers to a group of piconets interconnected to each other.

A device K is the master of a device L and also a slave of a device M.

A device O also belongs to a scatternet O. The device O is a slave of a device P and also a slave of a device Q.

FIG. 3 illustrates a case where five different device groups are formed.

A device D is an advertiser, and a device A is an initiator (group D).

A device E is a scanner, and a device C is an advertiser (group C).

A device H is an advertiser, and a device I and a device J are scanners (group H).

The device K is also an advertiser, and a device N is an initiator (group K).

A device R is an advertiser, and the device O is an initiator (group R).

The device A and the device B use one BLE piconet physical channel.

The device A and the device C use another BLE piconet physical channel.

In the group D, the device D performs advertising using an advertisement event which may be connected to an advertising physical channel, and the device A is an initiator. The device A may establish a connection to the device D and add a device to the piconet A.

In the group C, the device C performs advertising through an advertising physical channel using a certain type of an advertisement event captured by the scanner device E.

The group D and the group C may use different advertising physical channels or different time frames so as to avoid a collision.

The piconet F has one physical channel. The device F and the device G use a single BLE piconet physical channel. The device F is a master, and the device G is a slave.

The group H has one physical channel. The devices H, I, and J use one BLE advertising physical channel. The device H is an advertiser, and the devices I and J are scanners.

In the scatternet K, the devices K and L use a single BLE piconet physical channel. The devices K and M use another BLE piconet physical channel.

In the group K, the device K performs advertising using an advertisement event which may be connected to an advertising physical channel, and the device N is an initiator. The device N may establish a connection with the device K. In this case, the device K functions as a slave of two devices and also as a master of one device.

In the scatternet O, the devices O and P use a single BLE piconet physical channel. The devices O and Q use different BLE piconet physical channels.

In the group R, the device R performs advertising using an advertisement event which may be connected to an advertising physical channel, and the device O is an initiator. The device O may establish a connection with the device R. In this case, the device O functions as a slave of two devices and also a master of one device.

FIGS. 4 and 5 illustrate an example of Bluetooth communication architecture to which methods according to embodiments of the present invention may be applied.

More specifically, FIG. 4 shows an example of the Bluetooth BR/EDR technology, and FIG. 5 shows an example of Bluetooth Low Energy (BLE) architecture.

First, as shown in FIG. 4, the Bluetooth BR/EDR architecture includes a controller stack 410, a host controller interface (HCI) 420, and a host stack 430.

The controller stack 410 (or controller module) refers to hardware for sending or receiving Bluetooth packets to and from a wireless transmission and reception module dealing with Bluetooth signals of 2.4 GHz. The controller stack 410 includes a BR/EDR Radio layer 411, a BR/EDR Baseband layer 412, and a BR/EDR Link Manager layer 413.

The BR/EDR Radio layer 411 sends and receives radio signals of 2.4 GHz, and is capable of transmitting data by hopping 79 RF channels when Gaussian frequency shift keying (GFSK) modulation is used.

The BR/EDR baseband layer 412 sends a digital signal, selects a channel sequence in which hopping is performed 1600 times per second, and sends time slot spanning of 625 us for each channel.

The link manager layer 413 controls an overall operation of BLE, such as link setup, control, and security, using a link manager protocol (LMP).

The link manager layer 413 may perform the following functions.

Control of ACL/SCO logical transport and logical link setup

Detach: removes a connection and informs a corresponding device of a cause of removal.

Performs power control and role switch

Performs a security function, such as authentication, pairing, and encryption.

The host controller interface layer 420 provides an interface between a host module 430 and a controller module 410 so that a host may provide a command and data to a controller and the controller may provide an event and data to the host.

The host stack (or host module) 430 includes a logical link control and adaptation protocol (L2CAP) 437, a service discovery protocol (SDP) 433, a BR/EDR protocol 432, BR/EDR profiles 431, an attribute protocol 436, a generic access profile (GAP) 434, and a generic attribute profile (GATT) 435.

The L2CAP 437 provides one bilateral channel for sending data according to a specific protocol or specific profile.

The L2CAP multiplexes various protocols and profiles provided by Bluetooth upper layers.

The L2CAP of the Bluetooth BR/EDR specification uses a dynamic channel; supports a protocol service multiplexer, retransmission, and streaming mode, and provides segmentation and reassembly, per-channel flow control, and error control.

The SDP 433 refers to a protocol used to search for a service (or a profile and protocol) supported by a Bluetooth service.

The BR/EDR protocols and profiles 432, 431 define a service using the Bluetooth BR/EDR specification and an application protocol by which an exchange of data is performed.

The attribute protocol 436 relies on a server-client structure, which defines a rule for a corresponding device so as to access data. Six message types are defined as below: a Request message, a Response message, a Command message, a Notification message, and an Indication message.

Request message from a client to a server with a Response message from a server to a client Command message from a client to a server without a Response message Notification message from a server to a client without a Confirm message Indication message from a server to a client with a Confirm message from a client to a server The GATT 435 defines an attribute type.

The GAP 434 defines a method for discovering and connecting a device, and a method for providing information to a user. The GAP provides a privacy scheme.

As shown in FIG. 5, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 510, GATT based profiles 520, a generic attribute profile (GATT) 530, an attribute protocol (ATT) 540, a security manager (SM) 550, and a logical link control and adaptation protocol (L2CAP) 560. The host stack is not limited to the aforementioned composition, but may include various protocols and profiles.

The host stack multiplexes various protocols and profiles provided by that Bluetooth specification using the L2CAP.

First, the L2CAP 560 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 550 authenticates a device, which is a protocol for providing a key distribution.

The ATT 540 relies on a server-client structure, which defines rules for a corresponding device for data access. Six message types are defined: Request, Response, Command, Notification, Indication, and Confirmation.

Request and Response message: the Request message is used when a client device requests specific information from a server device, and the Response message is used in response to a Request message, which is transmitted from the server device to the client device.

Command message: The Command message is transmitted from a client device to a server device in order to indicate a command for a specific operation, but the server device does not send a response to a Command message to the client device.

Notification message: A server device sends this message to a client device in order to provide notification of an event, but the client device does not send a confirmation message to the server device in response to a Notification message.

Indication and Confirm message: A server device sends this message to a client device in order to provide notification of an event. Unlike in the Notification message, the client device sends a Confirm message to the server device in response to an Indication message.

The GAP is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

Service: A combination of actions related to data, and it defines the basic operation of a device.

Include: Define a relationship between services.

Characteristics: A data value used by a service

Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: It provides an alarm service according to the distance.

Proximity: A method for exchanging battery information.

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 590, a link layer 580, and a host controller interface 570.

The physical layer 590 (or a wireless transmission and reception module) sends and receives radio signals of 2.4 GHz, and uses GFSK modulation and frequency hopping utilizing 40 RF channels.

The link layer 580 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption can be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE specification, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices can scan the discoverable device through an advertising (or broadcast) physical channel.

Both of the discovering device and the discoverable device may already have been connected to other Bluetooth devices in a piconet.

Connecting Procedure

A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) from advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters the connection state when a device makes a connection request, that is, an initiating device sends a CONNECT_REQ PDU to an advertising device or the advertising device receives a CONNECT_REQ PDU from the initiating device.

Establishing a connection may be taken into consideration after the link layer enters the connection state. However, establishing a connection when the link layer enters the connection state may not need to be taken into consideration. The only difference between a newly created connection and an existing connection is a supervision timeout value for a link layer connection.

When two devices are connected to each other, they play respective different roles.

A link layer playing the role of a master is called a master device, whereas a link layer playing the role of a slave is called a slave device. A master device adjusts timing of a connection event. In this case, the connection event denotes the time when the mast device and a slave device are synchronized.

A master device (or central device) is a device that periodically scans a connectable advertising signal in order to establish a connection with other devices (slave or peripheral devices), and requests an appropriate device to establish a connection.

Furthermore, once connected to a slave device, a master device sets up timing and supervises a periodic data exchange.

In this case, the timing may be a hopping rule applied to two devices which exchange data through the same channel.

A slave (or peripheral) device is a device that periodically sends a connectable advertising signal in order to establish a connection with other devices (master devices).

Therefore, if a master device which has received a connectable advertising signal sends a connection request, a slave device accepts the request and establishes a connection with the master device.

After a slave device establishes a connection with a master device, the slave device periodically exchanges data by hopping a channel according to timing specified by the master device.

The packets defined in the Bluetooth interface is described briefly below. BLE devices use the packets described below.

Packet Format

The link layer has only one packet format used for both an advertising channel packet and a data channel packet.

Each of the packets includes four fields: a preamble, an access address, a PDU, and CRC.

If one packet is transmitted through an advertising physical channel, the PDU may function as an advertising channel PDU. If one packet is transmitted through a data physical channel, the PDU may function as a data channel PDU.

Advertising Channel PDU

The advertising channel PDU includes a 16 bit header and a payload of various sizes.

The PDU type filed of an advertising channel included in the header supports PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDUs

The data channel PDU includes a 16 bit header and a payload of various sizes, and may include a Message Integrity Check (MIC) field.

The procedures, statuses, and packet formats of the BLE technology described above may be applied to perform methods according to embodiments of the present invention.

Hereinafter, the connection procedure defined in the BLE technology is described briefly. As an example of the connection procedure, a method for providing an object transmission service according to the BLE specification is described.

FIG. 6 shows an example of the GATT Profile structure of the BLE specification.

Referring to FIG. 6, one may see the structure for exchanging profile data defined in the BLE specification.

More specifically, the GATT defines a method for exchanging data using a service between BLE devices and characteristics thereof.

In general, a peripheral device (e.g., a sensor device) functions as a GATT server and performs the definition for the service and characteristics.

To read or write data, a GATT client sends a data request to the GATT server, initiates all of the transactions, and receives a response from the GATT server.

The GATT-based operational structure defined in the BLE is based on profiles, services, and characteristics, which form a hierarchical structure as shown in FIG. 6.

The profile may include one or more services, and the one or more services may include one or more characteristics or other services.

The service groups data into logical units and includes one or more characteristics or other services.

Each of the services has the identifier of 16 bits or 128 bits, which is called a universal unique identifier (UUID).

The characteristic forms the lowest unit in the GATT-based operational structure. The characteristic includes only one datum and has a UUID of 16 bits or 128 bits like the service.

The characteristic includes descriptors for various types of information and requires one attribute to describe each piece of information. The characteristic may use a couple of consecutive attributes.

The attribute includes four elements as follows.

Handle: the address of the attribute

Type: the type of the attribute

Value: the value of the attribute

Permission: an access right to the attribute

A connection procedure in BLE is described below. For example, a method for providing an object transfer service according to the BLE is described as the connection procedure.

Overview of Isochronous Channel

FIG. 7 shows characteristics of an audio signal.

As shown in FIG. 7, in the case of an audio signal, audio streaming data or audio data is periodically generated at an idle event interval.

Audio data is generated periodically (or at a specific time interval) according to the characteristics thereof.

In this case, the specific time interval during which audio data is periodically generated may be represented as an idle event interval.

Audio data is transmitted at an individual idle event interval.

Furthermore, individual audio data may be transmitted throughout part of or the entire event interval.

As shown in FIG. 7, when audio streaming data generated periodically or regularly is transmitted according to the BLE mechanism, an advertisement and scanning procedure, a communication procedure, and a disconnection procedure have to be performed whenever the generated audio data is transmitted or received.

As shown in FIG. 7, however, since audio data is generated at a regular interval for most cases, latency needs to be guaranteed with respect to the transmission of the audio data regardless of the amount of the audio data.

If the advertisement and scanning procedure, the communication procedure, and the disconnection procedure are performed whenever newly generated audio data is transmitted, however, a latency problem occurs during the transmission of the audio data.

If the BLE technology rather than the Bluetooth BE/EDR technology is used, high energy efficiency can be achieved because a relatively small amount of audio data is transmitted through an HA or headset. As described above, however, great overhead is generated because the data channel process of the BLE technology involves advertising, connection, etc.

whenever data is transmitted. Accordingly, latency absolutely required for the transmission of audio data cannot be guaranteed.

Furthermore, the data channel process of the BLE technology involves sending intermittently generated data only when necessary, thereby improving energy efficiency by leading a BLE device in a different time region to deep sleep. Therefore, it may be difficult to apply the data channel process of the BLE technology to the transmission of audio data generated at a regular interval.

For such a reason, it is necessary to define a new mechanism in which periodically generated data, such as audio streams, is transmitted and received using the BLE technology.

Hereinafter, a method for sending and receiving data (e.g., audio data) generated at a regular interval using the BLE technology is described in detail.

In other words, a method for newly defining a channel for sending and receiving (or transceiving) data generated at a regular interval in the BLE technology, additionally defining a mechanism related to the handling of regular data without affecting energy performance of BLE, and sending data generated at a regular interval is provided below.

The phrases, such as audio streaming data, audio data, audio streaming, and audio stream used in this document, may be construed as providing the same meaning.

The term "audio data" is hereinafter used to represent the different terms, for convenience of understanding.

Isochronous Channel and Definition of a Mechanism Related to Isochronous Channel A new channel, that is, an isochronous channel, is defined to send data generated at a regular interval using the BLE technology.

An isochronous channel is used to send isochronous data to devices using isochronous streams.

Isochronous data refers to data transmitted at a particular time interval, that is, periodically or regularly.

In other words, an isochronous channel may represent a channel for sending and receiving periodically generated data, such as audio data, in the BLE technology.

An isochronous channel may be used to send and receive audio data to and from a single member, three of one or more coordinated members, or a plurality of members.

Furthermore, an isochronous channel corresponds to an isochronous stream, such as an audio stream, or a flushing channel which may be used to send and receive important data in other time regions.

Methods using an isochronous channel described later are used independently of the advertising channel and data channel defined in the existing (v4.2 or earlier) BLE technology.

Furthermore, this document additionally defines a new frequency channel and frequency hopping interval for an isochronous channel.

An isochronous channel enables a conductor to send an isochronous stream such as flushable data (e.g., time-bound audio data) to one or more members using the BLE.

In this case, the conductor may be represented as a master, and the member may be represented as a slave.

Furthermore, an isochronous channel may or may not be configured by security setting.

Furthermore, an isochronous channel may be set up for various topologies to allow the transmission of an isochronous stream between a single conductor and a member, between a single conductor and a coordinated pair of members which generates a stereo audio stream, such as hearing aids or stereo headsets, and between a single conductor and a plurality of members synchronized with the same isochronous stream(s).

In this case, the member may send data to the conductor through an isochronous channel.

Furthermore, the isochronous channel may support the transmission and reception of shared audio, public audio, and broadcast audio as well as the transmission and reception of personal audio.

A procedure for setting up an isochronous channel requires that hierarchy of profile level security and reliability requirements satisfy use cases.

Furthermore, an isochronous channel may be used for various applications, by which a plurality of audio sources and sinks may be set up, and complicated topologies may be set up to allow users to regularly change or share different audio streams.

FIG. 8 shows an example of a protocol stack of BLE which may use an isochronous channel.

Referring to FIG. 8, the protocol stack of BLE which supports an isochronous channel may be different from the protocol stack of FIG. 5.

More specifically, the protocol stack of BLE which supports an isochronous channel further includes an audio middleware layer added to the protocol stack of FIG. 5.

The audio middleware layer supports an isochronous channel for continuous data transmission and reception.

The isochronous channel includes a connection-oriented isochronous (ICO) channel for sending and receiving continuous data, that is, for point-to-point transmission, in an LE connection state and a connectionless isochronous (ICL) channel for sending and receiving continuous data, that is, for broadcast transmission, in a BLE non-connection state.

Continuous data (e.g., audio stream data) may be transmitted and received through the ICO and ICL channels of the audio middleware layer of BLE.

FIG. 9 shows an example of a home ecosystem for applications to which an isochronous channel may be applied.

In other words, FIG. 9 shows an example of the space in which a plurality of audio conductors and members to which methods according to embodiments of the present invention may be applied may move around inside/outside domains.

As shown in FIG. 9, the existence of various conductors and members indicate that an isochronous channel is required as a method for providing notification of the presence of members so that the members can obtain information necessary to form the isochronous channel.

An isochronous channel may also be used for the transmission and reception of non-audio data.

A member may use isochronous channels to determine existence of notification messages which may include acquisition information from conductors within the range of BLE communication.

Furthermore, the member may use isochronous channels to receive a request with respect to control information or service data from one or more devices acting like a remote controller.

FIG. 10 shows an example of the type of an isochronous channel.

Referring to FIG. 10, the isochronous channel may include a channel for point-to-point transmission and a channel for broadcast transmission.

More specifically, FIG. 10(*a*) shows connection-oriented isochronous (ICO) channels, that is, isochronous channels for point-to-point transmission. In FIG. 10(*a*), a master device and a slave device are connected through ICO channels, and may send and receive bi-directional data and responses thereto through the ICO channels.

The master device and the slave device may perform an LE connection (e.g., an ACL connection) in order to form and configure the ICO channels. In this case, the ACL connection and the roles of the master device and the slave device in the ICO channel are the same.

FIG. 10(b) shows connectionless isochronous (ICL) channels, that is, isochronous channels for broadcast transmission. The ICL channel is a channel for sending and receiving data in a BLE non-connection state. One or more slave devices have been synchronized with respective ICL channels from a master device in order to receive data.

The ICL channel sends one-way, but does not send a response thereto.

That is, the one or more slave devices are able to only receive data from the master device through the ICL channels, but are unable to send data to the master device through the ICL channels.

An embodiment of the present invention proposes a method for sending and receiving audio streams such an ICO channel and/or ICL channel.

FIG. 11 shows an example of operating state transition according to the BLE technology.

As shown in FIG. 11, an isochronous channel (or an ISO channel) may operate in conjunction with an advertisement channel and data channel of the
BLE technology.

Referring to FIG. 11, a BLE device may change the operating state to (1) a first connected state or (2) a second connected state in which data is transmitted and received in an advertisement state.

In this case, the first connected state refers to an operating state in which the BLE device sends and receives data through a data channel, and the second connected state refers to an operating state in which the BLE device sends and receives data through an isochronous channel.

The BLE device may change its operating state to the first or second connected state depending on the type of data transmitted and received to and from devices or a data transmission type.

More specifically, the BLE device generates a data channel from an advertisement channel operating in the first connected state, and also generates an isochronous channel from an advertisement channel operating in the second connected state.

Furthermore, if the BLE device changes its operating state from the first connected state to the advertisement state, it releases a generated data channel. If the BLE device changes its operating state from the second connected state to the advertisement state, it releases a generated isochronous channel.

For example, the BLE device changes its operating state from the advertisement state to the second connected state in order to send and receive audio data. In other words, the BLE device may send and receive audio data through the isochronous channel while it is connected to the second connected state.

Furthermore, the BLE device changes its operating state from the advertisement to the first connected state in order to send and receive data generated in a random fashion or intermittently.

In other words, the BLE device may send and receive the data through the data channel in the first connected state.

As shown in FIG. 11, the BLE device makes a transition from the advertisement state to the first connected state by generating a data channel, if necessary, and sends and receives data through the generated data channel.

When the transmission and reception of the data through the data channel is completed, the BLE device closes the generated data channel and returns to the advertisement state, that is, the advertisement channel.

Likewise, the BLE device makes a transition from the advertisement state to the second connected state by generating an isochronous channel, if necessary, and sends and receives data through the generated isochronous channel.

When the transmission and reception of the data through the data channel is completed, the BLE device closes the generated isochronous channel and returns to the advertisement state, that is, the advertisement channel.

As described above, the isochronous channel is generated in order to send and receive data generated at a regular interval, such as audio data, while the data channel is generated in order to send and receive data irregularly or intermittently.

FIG. 12 shows examples of an isochronous channel packet format which may be applied to methods according to embodiments of the present invention.

The format of the isochronous channel packet transmitted through an isochronous channel is the same as that shown in FIGS. 12(a) and (b), but the present invention is not limited thereto and may have a different format.

As shown in FIG. 12(a), all of isochronous channels may have the packet format defined in the Bluetooth specification v4.2 supporting an isochronous data PDU of 2 to 257 octets.

FIG. 12(a) shows an example of an extended PDU packet format, and the extended PDU packet format 1210 includes a preamble 1211, an access address 1 212, a PDU 1211, and cyclic redundancy check (CRC) 1214.

The preamble may include 1 octet, an access address of 4 octets, a PDU of 2 to 257 octets, and CRC of 3 octets.

FIG. 12(b) shows an example of an isochronous packet, and the isochronous packet (or isochronous channel PDU 1220) may include a header 1221 of 16 bits and payload 1222 of 0 to 255 octets.

Furthermore, the isochronous packet may include a length field of an 8 bit size, which is used to check the length of data located next to the header.

The data length of the isochronous packet varies depending on the space between isochronous channels and may be limited by a channel parameter imposed by a conductor. The isochronous packet may further include a message integrity check (MIC) field.

FIG. 13 shows an example of the basic format of isochronous channel transfer to which methods according to embodiments of the present invention may be applied.

Isochronous channel timing is described later with reference to FIG. 13.

A conductor determines timing of all of packets transmitted through an isochronous channel.

Although a member is unable to directly set isochronous channel timing, it may provide required isochronous channel timing to a conductor.

The conductor establishes (or sets up) an anchor point 1310 which represents the time at which new information is transmitted. As shown in FIG. 13, anchor points are separated from each other at an isochronous connection interval 1320 in the form of a multiple of 1.25 ms (1.25 ms *n, where n is a natural number), and the isochronous connection interval ranges from 5 ms to 318.75 ms.

The isochronous connection interval is defined when the conductor establishes an isochronous connection channel, and is fixed while the isochronous connection channel is maintained.

In the isochronous connection interval, another transmission may follow the transmission of the conductor at the anchor point. The follow-up transmission may correspond to the retransmission of the conductor and ACK response of a member.

FIG. 14 is a flowchart illustrating an example of a method for sending and receiving audio streams through an LE connection to which a method proposed in this specification may be applied.

Referring to FIG. 14, the first device 200 that is a slave device, may establish an LE connection with the second device 300 that is a master device, may generate an isochronous channel, and may receive audio stream data through the isochronous channel.

A detailed procedure for receiving audio stream data through an LE connection is described in detail below.

LE Connection Establishment Procedure S1410

The first device 200 may perform an LE connection establishment procedure with the second device 300 in order to receive audio stream data from the second device 300.

In this case, the LE connection establishment procedure may be performed through the method described with reference to FIG. 7.

Service Level Connection Establishment Procedure S1420

After establishing an LE connection with the second device 300, the first device 200 may perform a service level connection establishment procedure.

For example, the first device 200 may perform state synchronization through the service level connection establishment procedure, and may open a control channel (i.e., a second channel) in order to control an isochronous channel (i.e., a first channel) for sending and receiving audio stream data.

In this case, the control channel may be one of BLE data channels.

If the first device 200 is divided into a left device and a right device like a headset, the state synchronization means that synchronization is performed between the left device and the right device and may be performed through the GATT message of BLE.

After opening the control channel, the first device 200 may perform a codec & transfer parameter negotiation procedure along with the second device 300 (S1430).

Codec & Transfer Parameter Negotiation Procedure S1430

The first device 200 may determine audio stream data and parameters related to the transmission and reception of the audio stream data through a codec parameter and transport parameter negotiation procedure along with the second device 300.

More specifically, the first device 200 may send a supported codec parameter and transfer parameter to the second device 300.

The codec parameter may include a codec name (or a codec type), a sample rate indicative of a total number of samples extracted during 1 second, a bit depth indicative of the potential precision of hardware or software which processes audio data in digital audio, a bit rate, a frame length, and audio channel information (e.g., mono, stereo, or dual mode).

The transfer parameter may include maximum transport latency, the number of audio streams, and an encryption level.

Thereafter, the first device 200 may receive a codec parameter and transfer parameter, supported by the second device, from the second device 300 and select proper parameters of common parameters.

In an embodiment, the second device 300 may select proper parameters of the received codec parameter and transfer parameter and send the selected parameters to the first device 200.

In an embodiment, the second device 300 may send a supported codec parameter and transfer parameter to the first device 200. The first device 200 may select proper parameters of the received parameters and send them to the second device 300.

Isochronous Connection Establishment Procedure S1440

After selecting proper parameters through the codec & transfer parameter negotiation procedure, the first device 200 and the second device 300 may perform an isochronous connection establishment procedure.

Through the isochronous connection establishment procedure, the first device 200 may form an audio stream along with the second device 300 and may open an isochronous channel for sending and receiving the formed audio stream.

In this case, the type (i.e., ICO or ICL) of the isochronous channel, a channel ID (CID), a channel map, a connection interval, latency, a channel count, and a retransmission count may be determined through the isochronous connection establishment procedure.

Audio Stream Connection Establishment Procedure S1450

The first device 200 that has opened the isochronous channel may perform, an audio stream connection establishment procedure along with the second device 300.

The audio stream connection establishment procedure is a procedure for sending and receiving the formed audio stream. The first device 200 may configure (or assign) a role for sending and receiving the formed audio stream to and from the second device 300 through the audio stream connection establishment procedure.

Furthermore, state synchronization may be performed between the first device 200 and the second device 300. The first device 200 and the second device 300 may open an audio link for sending and receiving the formed audio stream.

Thereafter, the first device 200 may receive an audio stream from the second device 300 and output the received audio stream to the outside through the output unit.

Through such a method, the first device 200 may determine proper parameters for sending, receiving, and playing back audio streams along with the second device 300, and may provide an audio streaming service through the determined parameters.

FIG. 15 is a flowchart illustrating another example of a method for sending and receiving audio streams through an LE connection to which a method proposed in this specification may be applied.

Referring to FIG. 15, unlike in the example of FIG. 14, a service level connection establishment procedure may not be performed, but state synchronization may be performed in an audio stream connection establishment procedure.

More specifically, the first device 200 may perform an LE connection establishment procedure along with the second device 300 in order to receive audio stream data from the second device 300 (S1510).

In this case, the LE connection establishment procedure may be performed through the method described with reference to FIG. 7.

The first device 200 may open a control channel in order to control an isochronous channel for sending and receiving audio stream data to and from the second device 300.

Thereafter, step S1520 and step S1530 are the same as step S1430 and step S1440 of FIG. 14, and a description thereof is omitted.

The first device 200 that has opened the isochronous channel may perform an audio stream connection establishment procedure along with the second device 300 (S1540).

The audio stream connection establishment procedure is a procedure for sending and receiving the formed audio stream. The first device 200 may configure (or assign) a role for sending and receiving the formed audio stream to and from the second device 300 through the audio stream connection establishment procedure.

Furthermore, state synchronization may be performed between the first device 200 and the second device 300. The first device 200 and the second device 300 may perform the state synchronization described at step S1420 of FIG. 14 through the GATT message.

Furthermore, the first device 200 and the second device 300 may open an audio link for sending and receiving the audio stream.

Thereafter, the first device 200 may receive an audio stream from the second device 300 and output the received audio stream to the outside through the output unit.

FIG. 16 is an embodiment to which the present invention may be applied and is a diagram illustrating a method for transmitting or receiving an audio stream through Bluetooth LE connection.

Referring to FIG. 16, it is assumed that the number of sub-events (NSE) is set to 4, a burst number (BN) is set to 2, and flush timeout (FT) is set to 1.

In this case, the NSE refers to the number of sub-events per channel. In this case, frequency hopping may be performed for each channel interval or frequency hopping may be performed for each sub-event. Furthermore, the BN refers to the number of packets (or data) transmitted for each channel interval. The FN refers to a maximum channel interval in which each packet may be transmitted or retransmitted.

If the NSE is 4, one channel interval may include four sub-events. Furthermore, if the BN is 2, two new packets may be transmitted from the first device (or master device) to the second device (or slave device) in one channel interval.

If the FT is 1, a packet is valid only in one channel interval. Accordingly, when a corresponding channel interval is terminated, a packet (or payload) not normally received by the second device may be flushed. A packet until it is flushed, that is, a packet that is valid during a channel interval, may remain in the buffer of the first device.

Furthermore, the packets may be transmitted from the first device to the second device through an isochronous channel.

More specifically, during a first channel interval 1601, the first device may transmit a first packet and a second packet.

In this case, the packet may also be called data, a data packet, payload, an audio stream, audio data, an audio packet, audio stream data or audio data payload.

Furthermore, the second device that has received the packet may transmit acknowledgement (ACK) or non-acknowledgement or unacknowledgement (NACK) for notifying the first device whether the packet has been received or not to the first device.

If the first device does not receive ACK for the first packet or receives NACK for the first packet during a sub-event, the first device repeatedly transmits the first packet.

If the first device does not receive ACK for the first packet or receives NACK for the first packet during four sub-events within the first channel interval 1601, the first packet and the second packet are flushed after the first channel interval 1601.

In a next channel interval, the first device may transmit a third packet and a fourth packet. During a first sub-event, the first device transmits the third packet and receives NACK for the third packet from the second device. During a second sub-event, the first device transmits the third packet again and receives ACK for the third packet from the second device.

After the first device receives ACK indicating that the third packet has been successfully received, it may transmit the fourth packet. During the remaining two sub-events, the first device transmits the fourth packet. If the first device receives NACK for the fourth packet from the second device during the remaining two sub-events, the fourth packet is flushed after the corresponding channel interval is terminated.

Furthermore, in a subsequent channel interval, the first device may transmit a fifth packet and a sixth packet. When the first device transmits the fifth packet and receives ACK for the fifth packet during a first sub-event, it may transmit the sixth packet during a second sub-event. Furthermore, when the first device receives ACK for the sixth packet, it may not transmit an additional packet during the corresponding channel interval because it has successfully transmitted both the fifth packet and the sixth packet.

In accordance with the present embodiment, there is no opportunity to transmit a packet from the first device to the second device in the first channel interval 1601. Accordingly, it is necessary to allocate all of packets within the channel interval to the same number of sub-events as the number of packets.

FIG. 17 is an embodiment to which the present invention may be applied and is a diagram illustrating a method for transmitting or receiving an audio stream through Bluetooth LE connection.

Referring to FIG. 17, it is assumed that the NSE is set to 4, the BN is set to 2, the FT is set to 1, and Min_Tx is set to 2. In this case, Min_Tx refers to a minimum number of sub-events allocated to each packet before a packet is flushed.

The Min_Tx may be defined as a value obtained by dividing a total NSE prior to flush timeout by a BN.

A packet transmission environment can be improved if a packet is not repeatedly received because the parameter (or condition) "Min_Tx" is added as described above. That is, from an impartiality viewpoint, an opportunity by which all of packets can be transmitted during the same number of sub-events can be assigned to all of the packets.

During the four sub-events within a channel interval, the first device may transmit two packets to the second device. Since Min_Tx is 2, the first device needs to allocate at least two sub-events to each of the two packets. In other words, the first device transmits two packets in each channel interval and transmits two packets to the second device at least twice (i.e., two or more times).

In this case, the value "Min_Tx value" may be set as a value obtained by dividing a total NSE value prior to flush timeout by a BN.

More specifically, the first device may transmit a first packet and a second packet during four sub-events within a first channel interval 1701.

Since Min_Tx is 2, two sub-events of the four sub-events are allocated to the second packet. Accordingly, although the first device does not receive ACK for the first packet or receives NACK for the first packet from the second device after it transmits the first packet during the first sub-event and the second sub-event, the first device transmits the second packet to the second device during the remaining two sub-events.

If the first device receives NACK for the second packet from the second device during the third sub-event and the fourth sub-event, the first packet and the second packet are flushed after the first channel interval 1701 elapses.

In a next channel interval, the first device may transmit a third packet and a fourth packet. During a first sub-event, the first device transmits the third packet and receives NACK for the third packet from the second device. During a second sub-event, the first device transmits the third packet again and receives ACK for the third packet from the second device.

After the first device receives ACK indicating that the third packet has been successfully received, it may transmit the fourth packet. During the remaining two sub-events, the first device transmits the fourth packet. If the first device receives NACK for the fourth packet from the second device during the remaining two sub-events, the fourth packet is flushed after the corresponding channel interval is terminated.

Furthermore, in a subsequent channel interval, the first device may transmit a fifth packet and a sixth packet. When the first device receives ACK for the fifth packet after it transmits the fifth packet during a first sub-event, it may transmit the sixth packet during a second sub-event. Furthermore, when the first device receives ACK for the sixth packet, it may not transmit an additional packet in the corresponding channel interval because it has successfully transmitted both the fifth packet and the sixth packet.

Although the value Min_Tx is set as in the present embodiment, an equal transmission opportunity may not be assigned to all of packets. This is described below with reference to FIG. 18.

FIG. 18 is a diagram for illustrating a problem which may be generated in a process of transmitting or receiving an audio stream through Bluetooth LE connection.

Referring to FIG. 18, it is assumed that the NSE is set to 4, the BN is set to 2, the FT is set to 2, and Min_Tx is set to 4. Furthermore, it is assumed that data transmission and reception environments are poor due to interference in a radio environment, severe fading, etc. in an interference period 1803.

For two channel intervals, the first device may transmit two packets to the second device.

During the first sub-event of a first channel interval 1801, the first device transmits the first packet to the second device. However, the first packet has a good possibility that it may not be successfully transmitted to the second device because the first channel interval 1801 belongs to the interference period 1803.

If the first device does not receive ACK for the first packet or receives NACK for the first packet, the first device repeatedly transmits the first packet during the four sub-events within the first channel interval 1801. Furthermore, the first device transmits the second packet in a second channel interval 1802, that is, a next channel interval, although the first packet is not successfully transmitted because the value Min_Tx is 4.

The second device may not successfully receive the second packet because the first sub-event and second sub-event of the second channel interval 1802 belong to the interference period 1803.

During the third sub-event of the second channel interval 1802, the first device transmits the second packet. There is a good possibility that the second device may successfully receive data because the third sub-event does not belong to the interference period 1803. During the third sub-event, the first device receives ACK for the second packet.

The first device may not transmit the second packet during the fourth sub-event because it has received ACK for the second packet.

Furthermore, the first packet is flushed after the second channel interval 1802.

During the interference period 1803, the second device may not normally receive a packet, and the first device may not normally receive ACK for the packet from the second device although the second device has normally received the packet.

In accordance with the present embodiment, the first packet does not have an opportunity that it may be transmitted to the second device because the first packet is transmitted for the interference period 1803 and flushed after the interference period 1803 elapses. That is, in accordance with the present embodiment, if a channel environment in some period of a flush timeout channel interval is poor, the first device does not assign an opportunity that all of packets will be transmitted under the same condition to all of the packets. It may lead to a data loss or a reduction of the data transfer rate because an opportunity that only some packets may be transmitted to the second device is assigned to some packets.

Accordingly, in order to solve such a problem, an embodiment of the present invention proposes a method for transmitting audio data using an interleaved method.

FIG. 19 is an embodiment to which the present invention may be applied and is a diagram for illustrating a method for transmitting or receiving an audio stream through Bluetooth LE connection.

Referring to FIG. 19, it is assumed that the NSE is set to 4, the BN is set to 2, the FT is set to 2, and Min_Tx is set to 4.

There is a good possibility that a packet may not be successfully transmitted in an interference period 1903. In contrast, there is a relatively good possibility that a packet may be transmitted after the interference period 1903 elapses.

In order to assign the same or similar possibility that all of packets will be transmitted to all of the packets, the first device (or master device) may transmit packets to the second device (or slave device) using an interleaved method.

In this case, the interleaved method transmission refers to a method for alternately transmitting data (or packets). For example, if the first device transmits two data using the interleaved method, it may alternately transmit the two data to the second device regardless of whether ACK has been received or not.

Since the BN is 2 and the FT is 2, the first device may transmit the two packets to the second device using the interleaved method for two channel intervals.

More specifically, the first device transmits a first packet to the second device during the first sub-event of a first channel interval 1901. Thereafter, although the first device does not receive ACK for the first packet, it transmits a second packet to the second device. Likewise, the first device alternately transmits the first packet and the second packet to the second device.

The first packet and the second packet transmitted using the interleaved method may not be transmitted to the second device because even the second sub-event of a second channel interval 1902 belongs to the interference period 1903. Thereafter, during the third sub-event of the second channel interval after the interference period 1903 elapses, the first device transmits the first packet and receives ACK for the first packet. During the fourth sub-event, the first device transmits the second packet and receives ACK for the second packet.

A flushed packet is not present because the first packet and the second packet have been successfully received by the second device during the first channel interval 1901 and the second channel interval 1902.

In accordance with the present embodiment, an equal transmission opportunity may be assigned to all of packets because packets are transmitted using the interleaved method. Accordingly, audio data, that is, time-bounded data, can be effectively transmitted, and the transfer rate of audio data can be improved.

FIG. 20 is an embodiment to which the present invention may be applied and is a diagram illustrating a method for transmitting audio data through Bluetooth LE.

Referring to FIG. 20, the profile 2001 of the first device (or master device) may request a host 2002 to transmit an audio stream.

The host 2002 of the first device may assign audio stream ID information and channel information to the requested audio stream and transmit the requested audio stream to a controller 2003. For example, the host 2002 may assign a stream ID and a channel ID to the requested audio stream and transmit the stream ID and the channel ID to the controller 2003.

The controller 2003 of the first device may transmit audio stream information and audio data (or audio stream data) to be transmitted to the controller 2006 of the second device (or slave device).

In this case, the controller 2003 may transmit the audio stream information (e.g., the stream ID, the channel ID, and a set value, such as a codec) through an asynchronous connection logical (ACL) transport channel 2004.

Furthermore, the controller 2003 may transmit the audio data through an isochronous channel (ISO) 2005.

FIG. 21 is an embodiment to which the present invention may be applied and is a diagram showing an example of audio stream information.

The first device (or master device) may transmit audio stream information, such as that shown in FIG. 21, to the second device (or slave device).

More specifically, the audio stream information may include Interleaved, ChannelNum, NSE, BN, StreamID, and ChannelID.

Interleaved is information for indicating whether the interleaved method is used or not, and may indicate the on or off of an interleaved mode and has 1 bit.

ChannelNum is information indicative of the number of channels included in one stream, and may have 5 bits. In this case, the channels may be divided into left, right, and center channels.

StreamID is the ID of an audio stream to identify the audio stream and may have 1 octet. ChannelID is the ID of a transmitted channel to identify the channel and may have 1 octet.

NSE is a value indicative of the number of sub-events within an event (or a channel interval) and may have 5 bits. BN is a value indicative of the number of packets to be transmitted during a channel interval that becomes flush-timeout, and may have 3 bits.

FIG. 22 is an embodiment to which the present invention may be applied and is a diagram illustrating a method for transmitting audio data using an interleaved mode method.

Referring to FIG. 22, the first device (or master device) may transmit the on or off information of an interleaved mode to the second device (or slave device). In this case, the interleaved mode is a mode in which a packet (or data) is transmitted using the interleaved method.

For example, when the interleaved mode is on, the first device may transmit packets to the second device using the interleaved method. In contrast, when the interleaved mode is off, the first device may transmit packets to the second device using a sequential manner. If packets are to be transmitted using the sequential method, the first device may sequentially transmit the packets. If ACK for each packet is not received from the second device, the first device may repeatedly transmit a corresponding packet.

More specifically, the first device may transmit information about audio data to be transmitted to the second device through the isochronous channel using the ACL transport channel.

In other words, the first device may transmit audio stream information to the second device through the ACL. For example, the audio stream information may be the audio stream information illustrated in FIG. 21.

The first device may notify the second device of whether it will transmit packets using the interleaved method using the audio stream information.

The sequence of packets in the case where the packets are transmitted using the interleaved method and the sequence of packets in the case where the packets are transmitted using the sequential method are different. The second device may predict packets to be transmitted by the first device because it is notified of interleaved mode information.

For example, in order to improve the possibility that a packet sequence is predicted, that is, so that a packet to be transmitted next can be predicted by the second device, the first device may periodically perform synchronization on the packet sequence along with the second device through the ACL transport channel.

Furthermore, for example, the first device or the second device may notify a counterpart of the sequence of next packets using a packet or ACK.

As shown in FIG. 22, if the interleaved mode is off, the first device may transmit a first packet and a second packet using the sequential method.

The first device may set the interleaved mode as on depending on the transmission environment (e.g., if channel interference is severe) of an audio stream, and may transmit the audio stream to the second device using the interleaved method. If the transmission environment of an audio stream is poor, the transmission success rate may be enhanced by transmitting the audio stream using the interleaved method.

FIG. 23 is an embodiment to which the present invention may be applied and is a diagram illustrating a method for transmitting audio data using Bluetooth LE.

1. The first device (or master device) sets the interleaved mode. That is, the first device determines whether to transmit a packet using the interleaved method.

2. If the interleaved mode is on, the first device determines a packet to be now transmitted using the interleaved method.

3. If the interleaved mode is off, the first device determines a packet to be now transmitted using the sequential method.

4. The first device transmits the packet (i.e., the packet to be now transmitted) to the second device according to the interleaved mode.

5. The first device waits for the reception of ACK for the packet from the second device.

6. The first device determines whether the packet has been successfully transmitted to the second devices using ACK for the transmitted packet.

7. If, as a result of the determination, it is determined that the packet has been successfully transmitted to the second device, the first device prepares a packet to be transmitted next. That is, the first device determines the packet to be transmitted next according to the interleaved mode by performing the aforementioned first step.

8. If, as a result of the determination, it is determined that the packet has not been successfully transmitted to the second device, the first device determines whether the packet has been subjected to flush-timeout.

9. If, as a result of the determination, it is determined that the packet has been subjected to flush-timeout, the first device deletes the packet.

10. If, as a result of the determination, it is determined that the packet has not been subjected to flush-timeout, the first device prepares a packet to be transmitted next.

Each of the steps described in the aforementioned embodiment may be performed by hardware/processors. Each of the modules/blocks/units described in the aforementioned embodiment may operate as hardware/processor. Furthermore, the methods proposed by the present invention may be executed in the form of code. The code may be written in a processor-readable storage medium and thus may be read by a processor provided by an apparatus.

Furthermore, the drawings have been divided and described for convenience of description, but the embodiments described with reference to the drawings may be merged to implement a new embodiment. An apparatus and method according to the present invention may not be limited and applied to the apparatus and method according to the embodiments as described above, and some or all of the aforementioned embodiments may be selectively combined and configured so that the embodiments are modified in various manners.

The method proposed by the present invention may be implemented in a processor-readable recording medium included in a network device, in the form of code readable by a processor. The processor-readable recording medium includes all types of recording devices in which data readable by a processor is stored. The recording medium may include ROM, RAM, CD-ROM, magnetic tapes, floppy disks, and optical data storages, for example. Furthermore, the processor-readable recording medium may be implemented in the form of carrier waves, such as transmission through the Internet. Furthermore, the processor-readable recording medium may be distributed to computer systems connected over a network, and the processor-readable code may be stored and executed in a distributed manner.

Furthermore, although some embodiments of this specification have been illustrated and described above, this specification is not limited to the aforementioned specific embodiments, and a person having ordinary skill in the art to which this specificaiton pertains may modify the present invention in various ways without departing from the gist of the claims. Such modified embodiments should not be individually interpreted from the technical spirit or prospect of this specification.

Those skilled in the art will understand that the present invention may be changed and modified in various ways without departing from the spirit or range of the present invention. Accordingly, the present invention is intended to include all the changes and modifications provided by the appended claims and equivalents thereof.

In this specification, both the apparatus and the method have been described, and the descriptions of both the apparatus and method may be complementarily applied.

What is claimed is:

1. A method of transmitting or receiving data using Bluetooth low energy (BLE) in a wireless communication system, the method being performed by a first device and comprising:

forming Bluetooth LE connection with a second device;

establishing an isochronous channel for transmitting an audio packet with the second device; and transmitting audio packets to the second device through the isochronous channel in interleaved method during a specific channel interval, wherein a sequence in which the audio packets are transmitted is determined regardless of whether acknowledgement (ACK) for each of the audio packets is received from the second device.

2. The method of claim 1, further comprising transmitting audio stream information related to audio stream composed of the audio packets to the second device, wherein the audio stream information includes at least one of a channel number indicative of a number of channels allocated to the audio stream, a number of sub-events indicative of a number of sub-events per channel interval, a burst number indicative of a number of audio packet which is capable of being transmitted during the specific channel interval, and a stream ID for identifying the audio stream or a channel ID for identifying a channel through which the audio stream is transmitted.

3. The method of claim 2, wherein the audio stream information is transmitted through an asynchronous connection logical (ACL) transport channel.

4. The method of claim 2, wherein:

transmitting the audio packets to the second device further comprising setting an interleaved mode to on or off indicative of a mode in which the audio packets are transmitted in interleaved method, and transmitting the audio packets to the second device through the isochronous channel in interleaved method when the interleaved mode is on.

5. The method of claim 4, wherein the audio stream information further comprises interleaved mode information indicative of an on or off of the set interleaved mode.

6. The method of claim 1, further comprising periodically synchronizing the sequence in which the audio packets are transmitted with the second device.

7. The method of claim 1, wherein an audio packet for which ACK has not been received from the second device or an audio packet for which negative acknowledgement (NACK) has been received from the second device is flushed after the at specific channel interval elapses.

8. A first device for transmitting or receiving data using Bluetooth low energy (BLE) in a wireless communication system, the device comprising:

a communication unit configured to communicate with an outside in a wireless or wired manner; and a processor operatively connected to the communication unit,
wherein the processor is configured to:
form Bluetooth LE connection with a second device;
establish an isochronous channel for transmitting an audio packet with the second device; and
transmit audio packets to the second device through the isochronous channel in an interleaved method during a specific channel interval,
wherein a sequence in which the audio packets are transmitted is determined regardless of whether acknowledgement (ACK) for each of the audio packets is received from the second device.

9. The device of claim 8, wherein:
the processor is configured to transmit audio stream information related to audio stream composed of the audio packets to the second device, and
the audio stream information includes at least one of a channel number indicative of a number of channels allocated to the audio stream, a number of sub-events indicative of a number of sub-events per channel interval, a burst number indicative of a number of audio packet which is capable of being transmitted during the specific channel interval, and a stream ID for identifying the audio stream or a channel ID for identifying a channel through which the audio stream is transmitted.

10. The device of claim 9, wherein the audio stream information is transmitted through an asynchronous connection logical (ACL) transport channel.

11. The device of claim 9, wherein the processor is configured to:
set an interleaved mode to on or off indicative of a mode in which the audio packets are transmitted in interleaved method, and
transmit the audio packets to the second device through the isochronous channel in interleaved method when the interleaved mode is on.

12. The device of claim 11, wherein the audio stream information further comprises interleaved mode information indicative of an on or off of the set interleaved mode.

13. The device of claim 8, wherein the processor is configured to periodically synchronize the sequence in which the audio packets are transmitted with the second device.

14. The device of claim 8, wherein an audio packet for which ACK has not been received from the second device or an audio packet for which negative acknowledgement (NACK) has been received from the second device is flushed after the at specific channel interval elapses.

* * * * *